United States Patent
Nishi

(10) Patent No.: US 10,317,653 B2
(45) Date of Patent: Jun. 11, 2019

(54) ZOOM LENS, OPTICAL DEVICE, AND METHOD FOR MANUFACTURING ZOOM LENS

(71) Applicant: Nikon Corporation, Minato-ku, Tokyo (JP)

(72) Inventor: Yasufumi Nishi, Edinburgh (GB)

(73) Assignee: Nikon Corporation, Tokyo (JP)

( * ) Notice: Subject to any disclaimer, the term of this patent is extended or adjusted under 35 U.S.C. 154(b) by 235 days.

(21) Appl. No.: 15/161,252

(22) Filed: May 22, 2016

(65) Prior Publication Data
US 2016/0341940 A1 Nov. 24, 2016

Related U.S. Application Data

(63) Continuation of application No. PCT/JP2014/005861, filed on Nov. 21, 2014.

(30) Foreign Application Priority Data

Nov. 22, 2013 (JP) .................................. 2013-241490
Jan. 22, 2014 (JP) .................................. 2014-009276
Jan. 22, 2014 (JP) .................................. 2014-009277

(51) Int. Cl.
*G02B 5/00* (2006.01)
*G02B 27/64* (2006.01)
(Continued)

(52) U.S. Cl.
CPC ............ *G02B 15/173* (2013.01); *G02B 5/005* (2013.01); *G02B 15/177* (2013.01); *G02B 27/646* (2013.01)

(58) Field of Classification Search
CPC .............................. G02B 15/173; G02B 15/177
(Continued)

(56) References Cited

U.S. PATENT DOCUMENTS 4,896,950 A 1/1990 Endo et al.
5,585,969 A 12/1996 Endo
(Continued)

FOREIGN PATENT DOCUMENTS

CN 102033306 A 4/2011
JP 63-205629 A 8/1988
(Continued)

OTHER PUBLICATIONS

International Search Report from International Patent Application No. PCT/JP2014/005861, dated Feb. 10, 2015.
(Continued)

*Primary Examiner* — Zachary W Wilkes
(74) *Attorney, Agent, or Firm* — Shapiro, Gabor and Rosenberger, PLLC

(57) ABSTRACT

In a zoom lens comprising a first lens group (G1) having positive refractive power, a second lens group (G2) having negative refractive power, a third lens group (G3) having positive refractive power, a fourth lens group (G4) having negative refractive power, and a fifth lens group (G5) having positive refractive power, the first to fifth lens groups (G1 to G5) are respectively moved along the optical axis so that a distance between the first lens group (G1) and the second lens group (G2), a distance between a distance between the second lens group (G2) and the third lens group (G3), a distance between the third lens group (G3) and the fourth lens group (G4), a distance between the fourth lens group (G4) and the fifth lens group (G5) respectively changes upon zooming from a wide-angle end state to a telephoto end state, so that a conditional expression "0.25<f1−/ft<0.38" is satisfied.

16 Claims, 17 Drawing Sheets

(51) Int. Cl.
*G02B 15/173* (2006.01)
*G02B 15/177* (2006.01)

(58) Field of Classification Search
USPC .................................................. 359/683, 676
See application file for complete search history.

(56) References Cited

U.S. PATENT DOCUMENTS

| | | | |
|---|---|---|---|
| 6,483,648 B1 | 11/2002 | Yamanashi | |
| 8,878,962 B2 * | 11/2014 | Shim | G02B 15/14 359/683 |
| 8,908,284 B2 * | 12/2014 | Tashiro | G02B 15/14 359/557 |
| 9,154,705 B2 * | 10/2015 | Morooka | H04N 5/23296 |
| 2007/0091459 A1 | 4/2007 | Yoneyama | |
| 2009/0116120 A1 | 5/2009 | Saruwatari | |
| 2009/0323198 A1 | 12/2009 | Kusaka | |
| 2010/0220400 A1 | 9/2010 | Yamamoto et al. | |
| 2011/0032625 A1 | 2/2011 | Saito | |
| 2011/0085248 A1 | 4/2011 | Ohtake et al. | |
| 2012/0026600 A1 | 2/2012 | Matsumura | |
| 2012/0087016 A1 | 4/2012 | Ito | |
| 2012/0188647 A1 | 7/2012 | Tanaka et al. | |
| 2012/0300096 A1 | 11/2012 | Miki et al. | |
| 2013/0100335 A1 | 4/2013 | Nanba | |
| 2013/0308043 A1 | 11/2013 | Ito et al. | |
| 2014/0125827 A1 | 5/2014 | Mimura et al. | |
| 2014/0211074 A1 | 7/2014 | Mimura et al. | |
| 2014/0218800 A1 | 8/2014 | Li et al. | |
| 2014/0368699 A1 | 12/2014 | Morooka et al. | |

FOREIGN PATENT DOCUMENTS

| | | |
|---|---|---|
| JP | 63-266415 A | 11/1988 |
| JP | 04-146407 A | 5/1992 |
| JP | 07-151970 A | 6/1995 |
| JP | 11-258506 A | 9/1999 |
| JP | 2001-083420 A | 3/2001 |
| JP | 2009-115958 A | 5/2009 |
| JP | 2009-156890 A | 7/2009 |
| JP | 2009-251280 A | 10/2009 |
| JP | 2009-294513 A | 12/2009 |
| JP | 2010-175899 A | 8/2010 |
| JP | 2010-191199 A | 9/2010 |
| JP | 2011-090265 A | 5/2011 |
| JP | 2011-145435 A | 7/2011 |
| JP | 2012-048199 A | 3/2012 |
| JP | 2012-98699 A | 5/2012 |
| JP | 2012-247564 A | 12/2012 |
| JP | 2013-011819 A | 1/2013 |
| JP | 2013-088737 A | 5/2013 |
| JP | 2013-134303 A | 7/2013 |
| JP | 2013-224993 A | 10/2013 |
| JP | 2013-228500 A | 11/2013 |
| JP | 2013-235060 A | 11/2013 |
| JP | 2013-254160 A | 12/2013 |
| JP | 2014-16400 A | 1/2014 |
| JP | 2014-095754 A | 5/2014 |
| JP | 2014-145983 A | 8/2014 |
| JP | 2014-153436 A | 8/2014 |
| JP | 2015-001550 A | 1/2015 |

OTHER PUBLICATIONS

Office Action dated Jan. 19, 2018, in Chinese Patent Application No. 201480070381.9.
English Translation of International Preliminary Report on Patentability from International Patent Application No. PCT/JP2014/005861, dated Jun. 2, 2016.
Office Action dated Sep. 17, 2018, in Chinese Patent Application No. 201480070381.9.
Office Action dated Mar. 5, 2019, in Japanese Patent Application No. 2018-063426.

\* cited by examiner

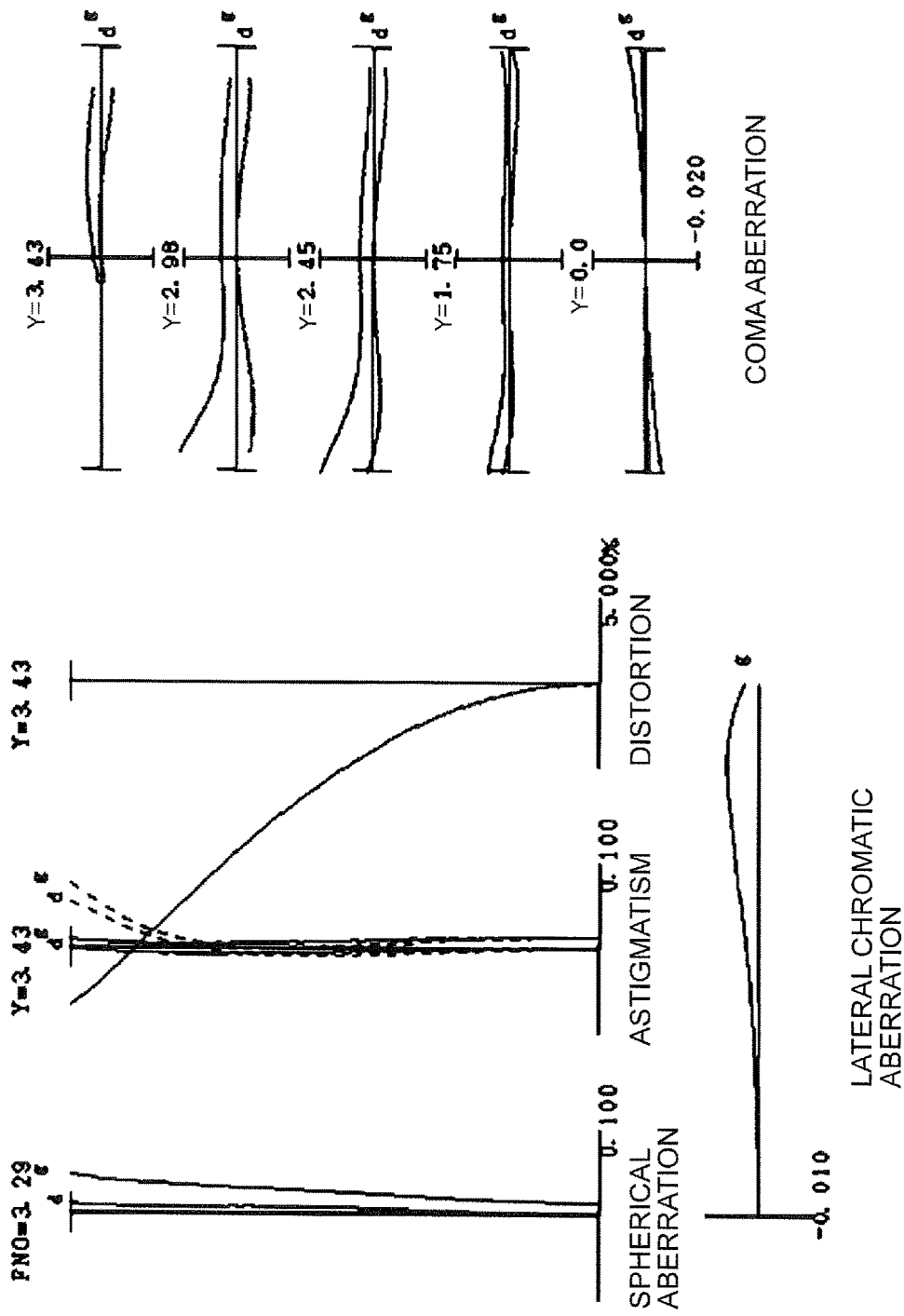

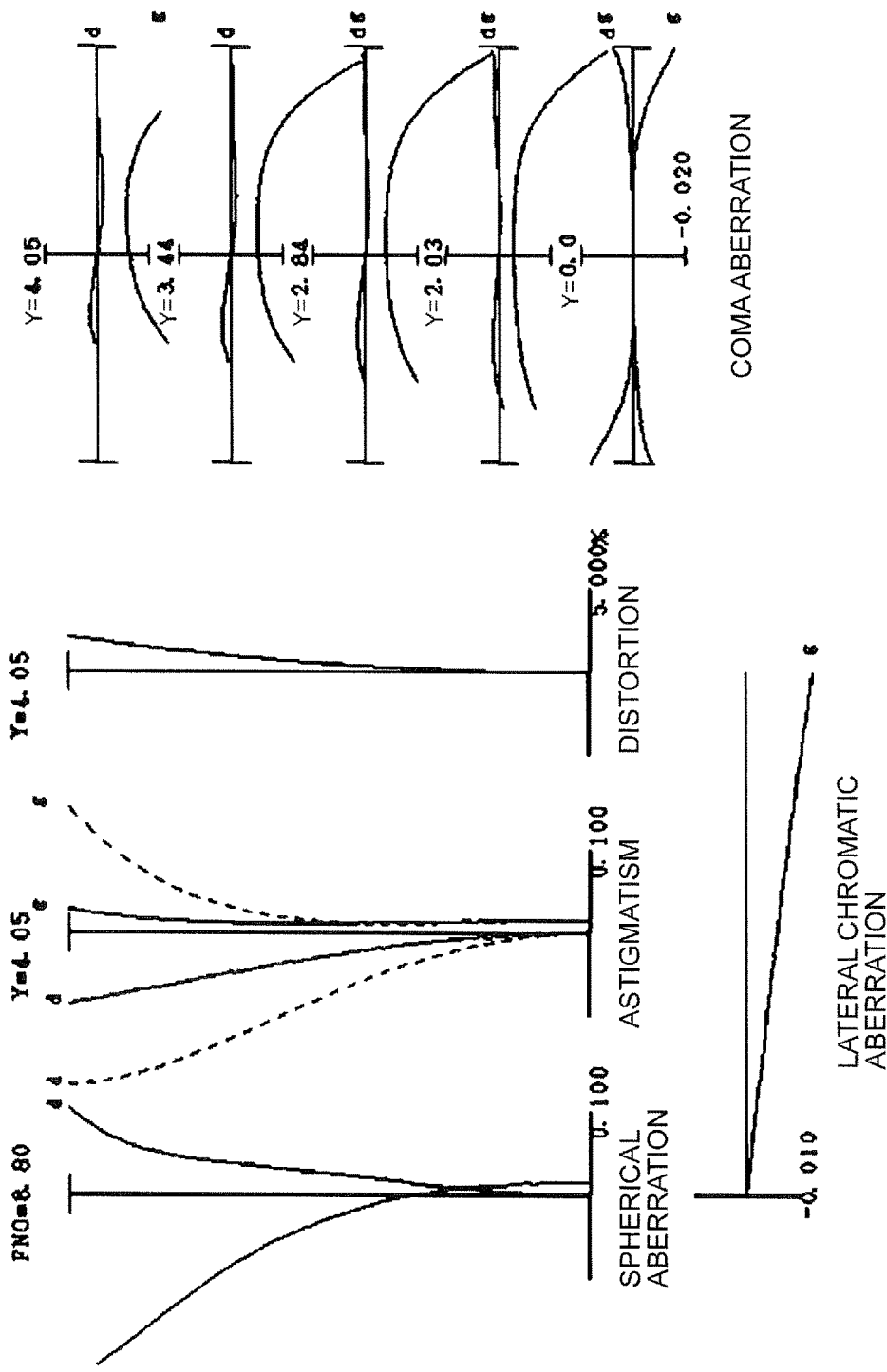

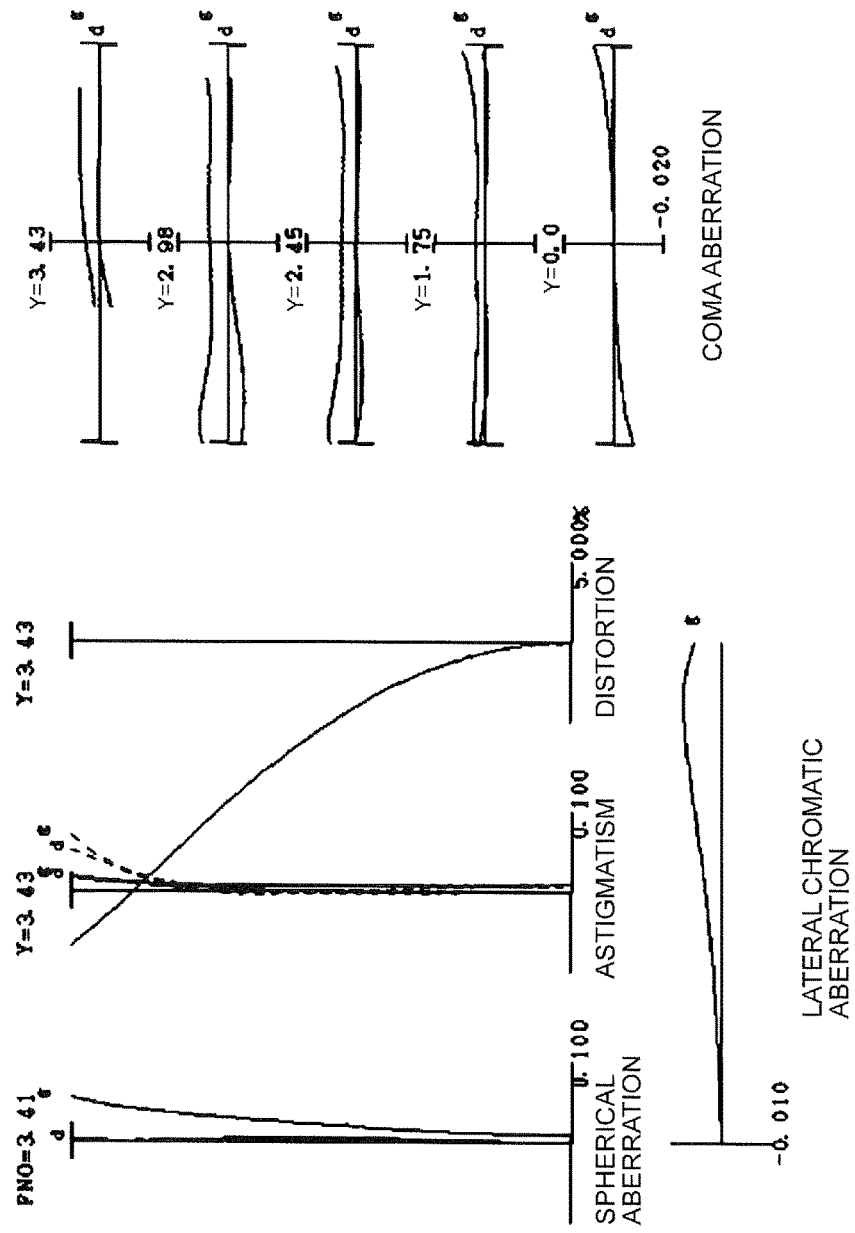

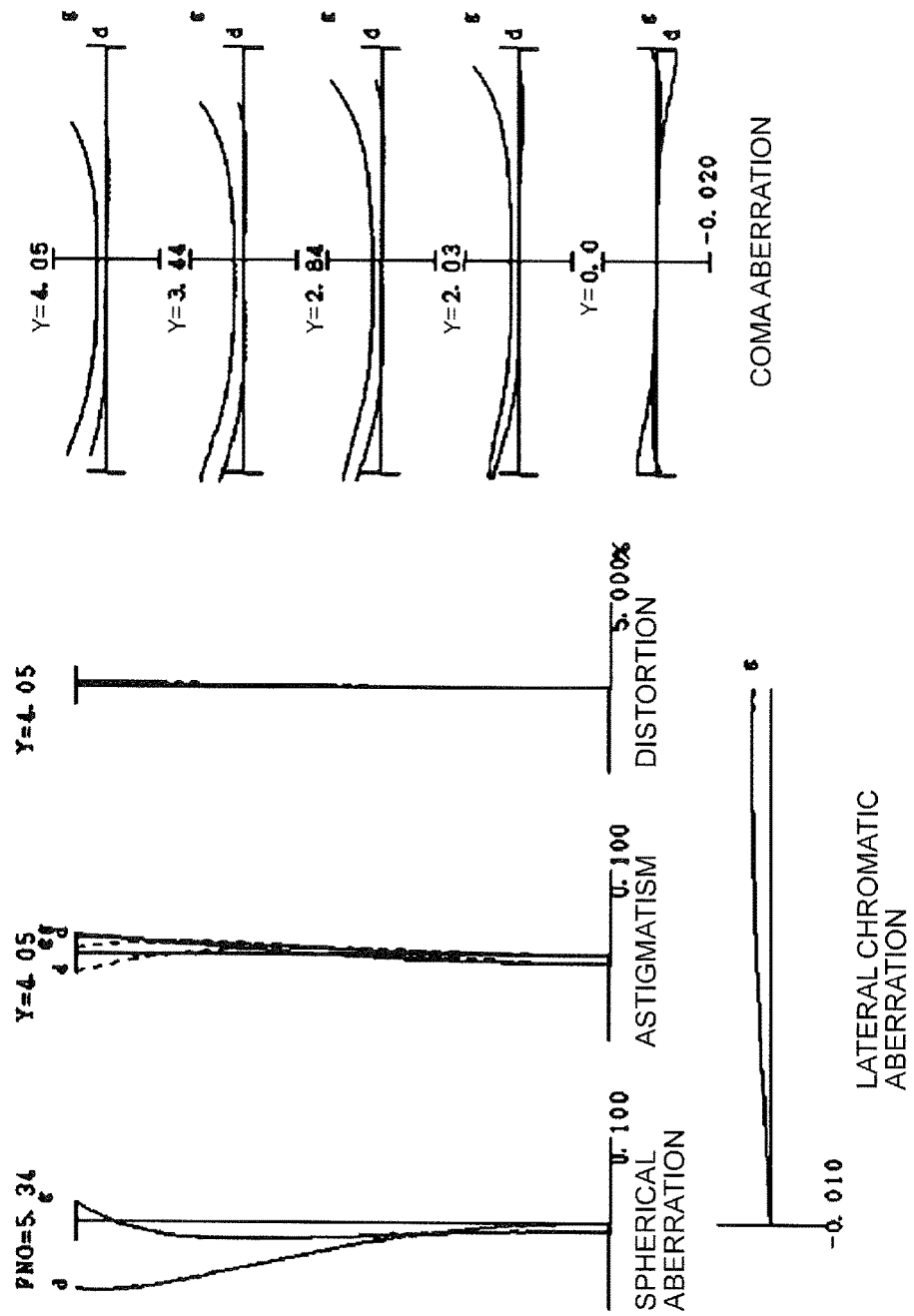

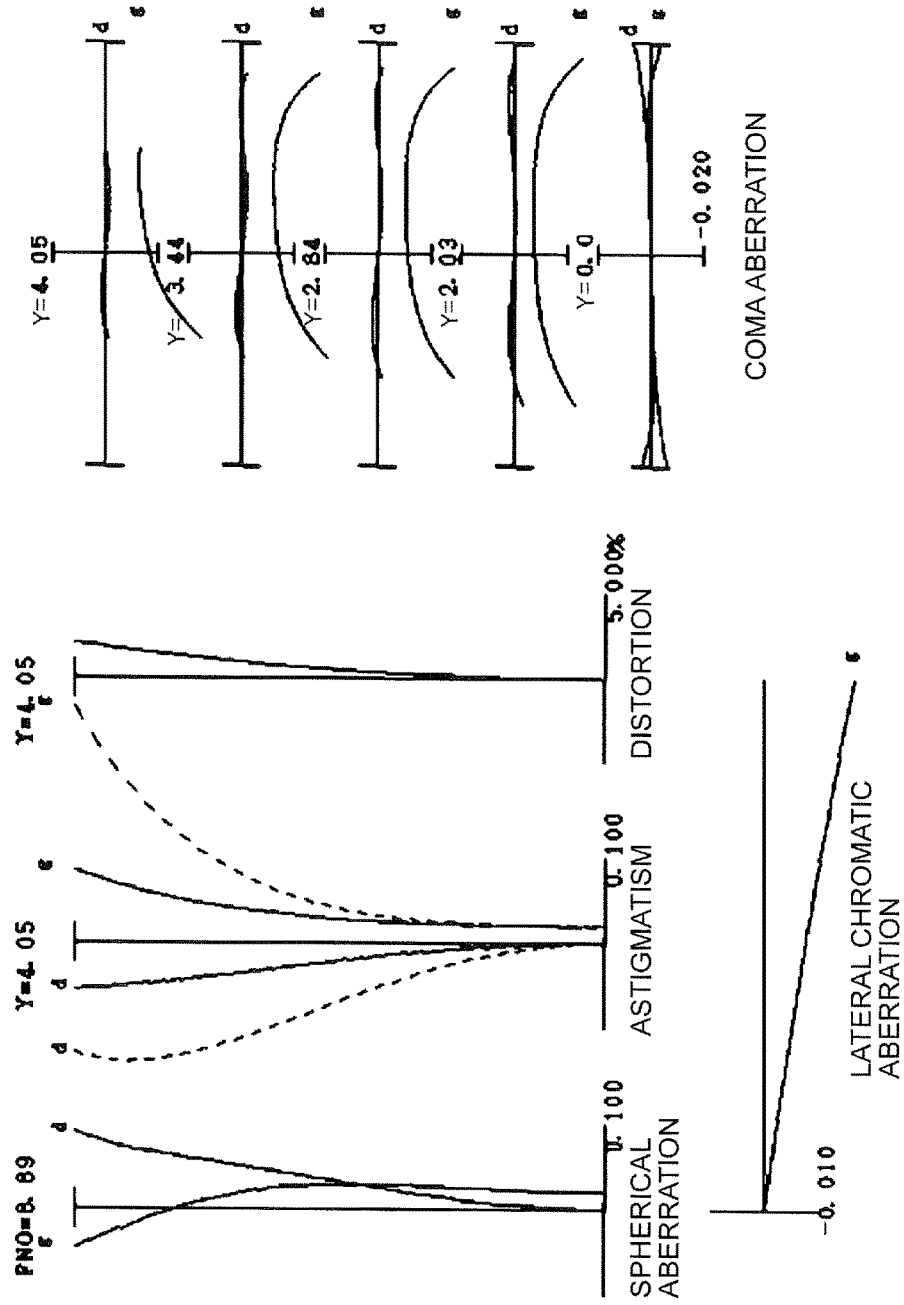

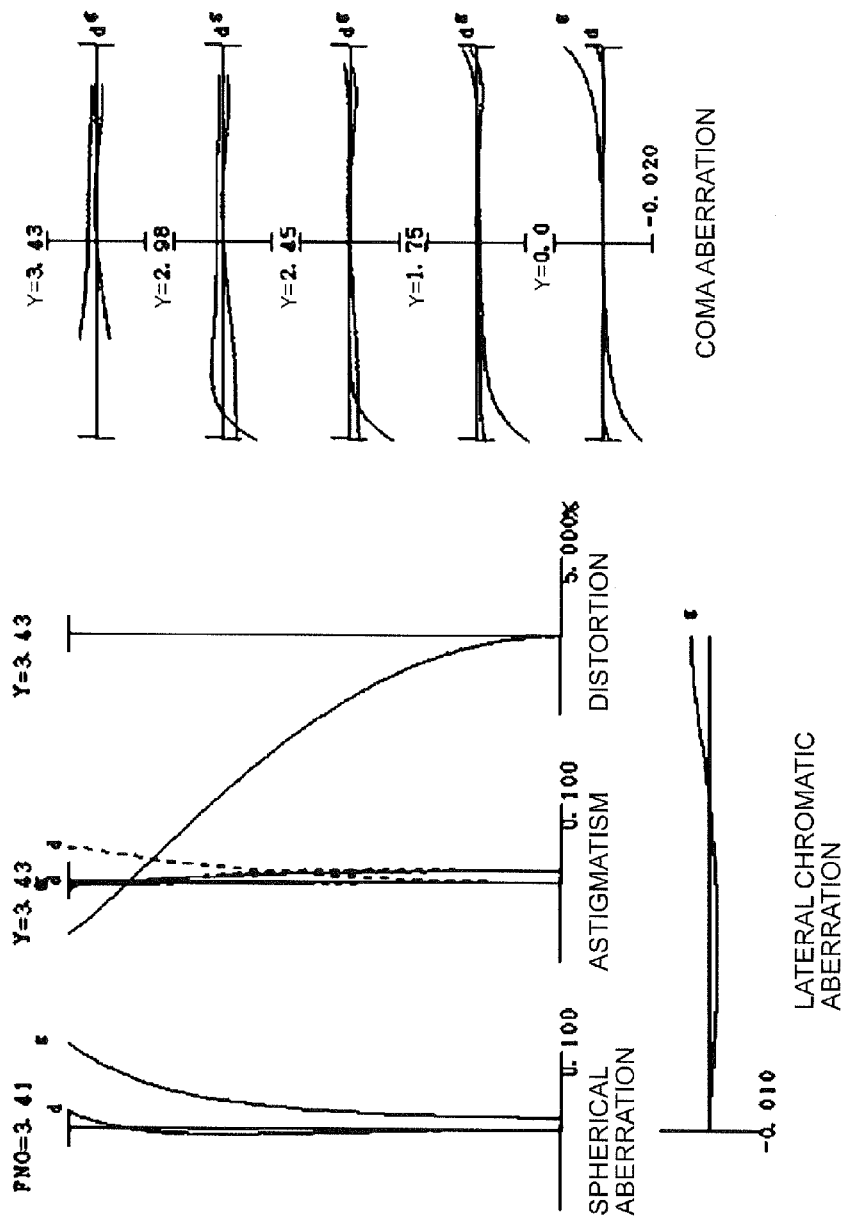

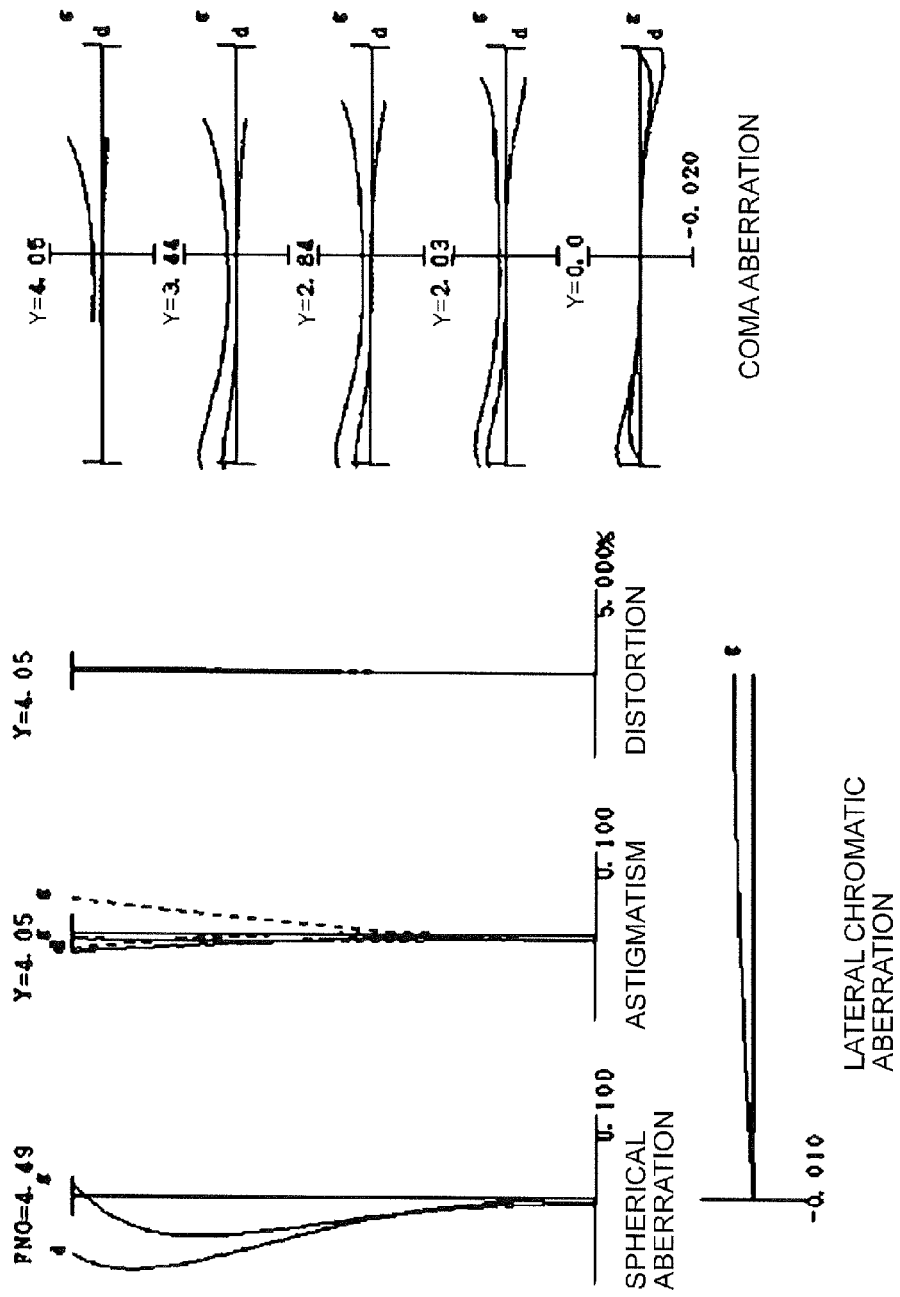

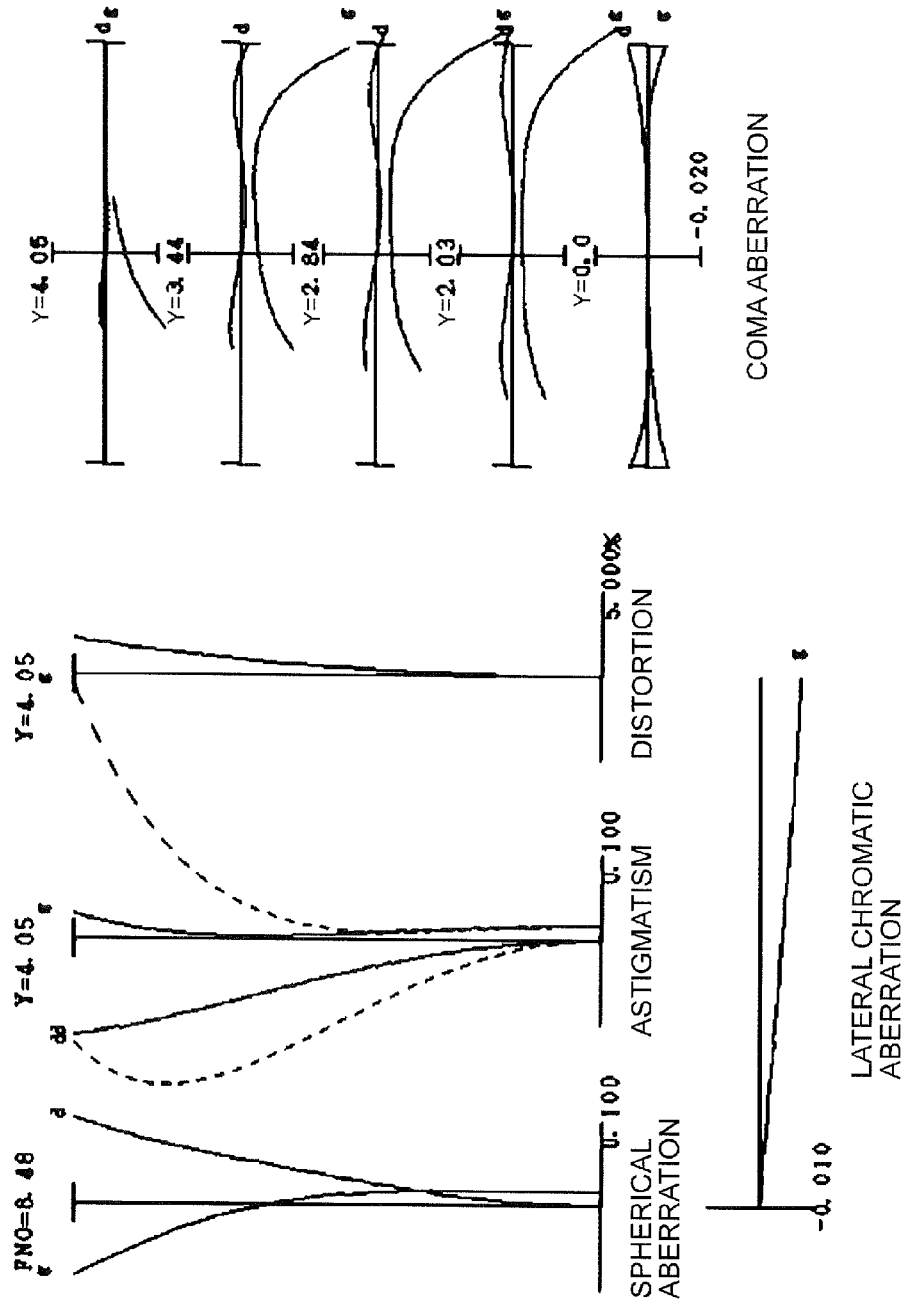

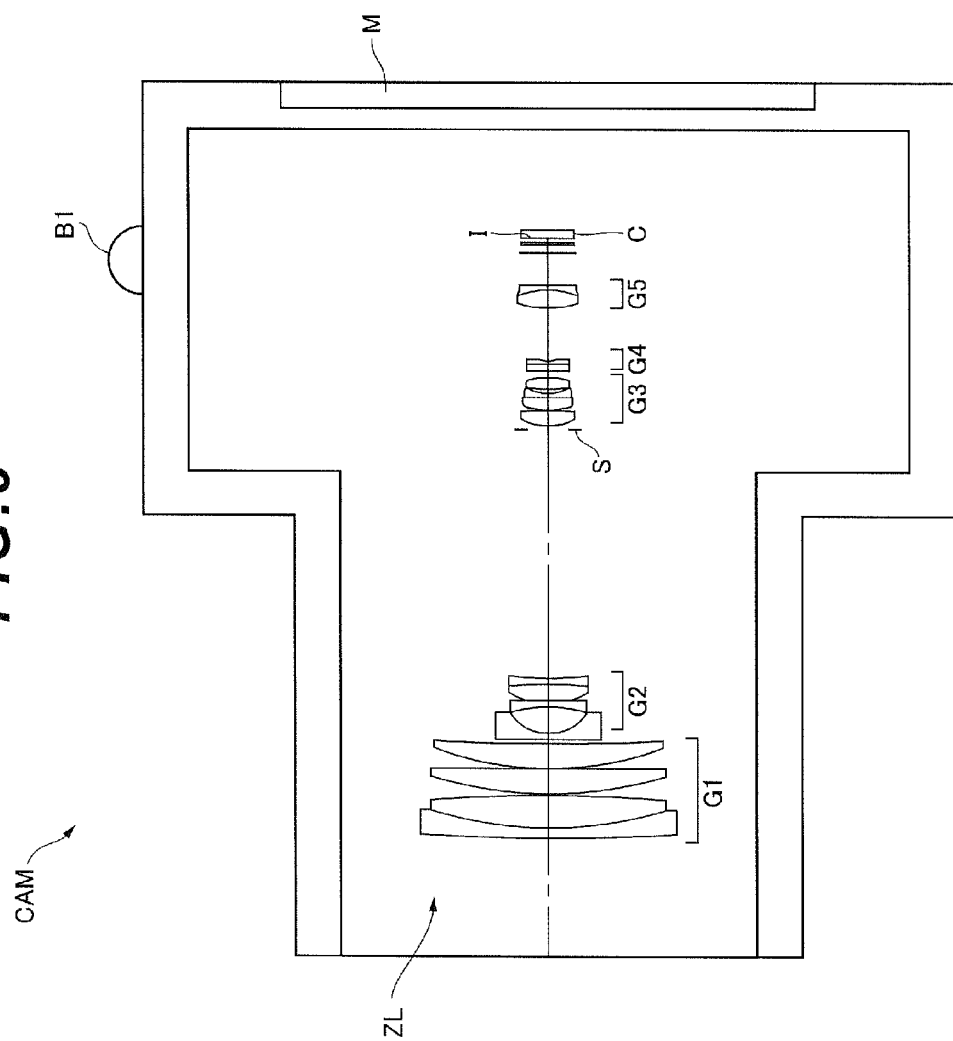

ZOOM LENS, OPTICAL DEVICE, AND METHOD FOR MANUFACTURING ZOOM LENS

TECHNICAL FIELD

The present invention relates to a zoom lens, an optical device, and a method for manufacturing the zoom lens.

TECHNICAL BACKGROUND

Conventionally, various zoom lenses which are applicable to photographic cameras, electronic still cameras, or video cameras, etc., and which have a large zoom ratio are proposed (For example, refer to PATENT DOCUMENT 1).

PRIOR ART LIST

Patent Document

PATENT DOCUMENT 1: Japanese Laid-Open Patent Publication No. 2012-98699 (A)

SUMMARY OF THE INVENTION

Problems to be Solved by the Invention

However, in the conventional zoom lenses, it was difficult to raise a zoom ratio while aiming to downsize a whole optical system.

The present invention is derived in view of such a problem, and aims to provide a zoom lens, an optical DEVICE, and a method of manufacturing the zoom lens which has a large zoom ratio although this is small, and has excellent optical performance.

Means to Solve the Problems

A zoom lens according to a first present invention comprises, in order on an optical axis from an object, a first lens group having positive refractive power, a second lens group having negative refractive power, a third lens group having positive refractive power, a fourth lens group having negative refractive power, a fifth lens group having positive refractive power, and the first lens group, the second lens group, the third lens group, the fourth lens group, and the fifth lens group respectively move on the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state, and the following conditional expression is satisfied.

$$0.25 < f1/ft < 0.38$$

however,
where f1 denotes a focal length of the first lens group, and ft denotes a focal length in the telephoto end state in the zoom lens.

In the zoom lens according to the first present invention, it is preferable that the following conditional expression is satisfied.

$$-0.180 < (f1 \times fw)/(f2 \times ft) < -0.160$$

however,
where fw denotes a focal length in the wide-angle end state of the zoom lens, and
f2 denotes a focal length of the second lens group.

In the first lens group according to the first present invention, it is preferable that the first lens group comprises three positive lenses.

In the zoom lens according to the first present invention, it is preferable that the first lens group comprises a cemented lens composed of a positive lens and a negative lens, and the following conditional expression is satisfied.

$$0.367 < nN1 - nP1$$

$$80 < vP1$$

however,
where nN1 denotes refractive index to a d-line of the negative lens which constitutes the cemented lens of the first lens group,
nP1 denotes refractive index to a d-line of the positive lens which constitutes the cemented lens of the first lens group, and
vP1 denotes an Abbe number of the positive lens which constitutes the cemented lens of the first lens group.

In the zoom lens according to the first present invention, it is preferable that the following conditional expression is satisfied.

$$-0.18 < f4/ft < -0.14$$

however,
where f4 denotes a focal length of the fourth lens group.

In the zoom lens according to the first present invention, it is preferable that the fourth lens group is composed of a cemented lens which is composed of one positive lens and one negative lens.

In the zoom lens according to the first present invention, it is preferable that an aperture stop is disposed in the neighborhood of the object side of the third lens group, and the following conditional expression is satisfied.

$$0.084 < \Delta Zwt/ft < 0.090$$

however,
where $\Delta Zwt$ denotes a moving distance on the optical axis to the object side of the aperture stop upon zooming from the wide-angle end state to the telephoto end state.

A zoom lens according to a second present invention comprises, in order on an optical axis from an object, a first lens group having positive refractive power, a second lens group having negative refractive power, a third lens group having positive refractive power, a fourth lens group having negative refractive power, and a fifth lens group having positive refractive power, and the first lens group, the second lens group, the third lens group, the fourth lens group, and the fifth lens group respectively move on an optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state, and the second lens group is composed of, in order on the optical axis from the object, a first negative lens, a second negative lens, and a positive lens, a third negative lens, and the positive lens and the third negative lens are cemented each other.

In the zoom lens according to the second present invention, it is preferable that the following conditional expression is satisfied.

$$-0.180 < (f1 \times fw)/(f2 \times ft) < -0.160$$

however,
where fw denotes a focal length in the wide-angle end state of the zoom lens,
ft denotes a focal length in the telephoto end state of the zoom lens,
f1 denotes a focal length of the first lens group, and
f2 denotes a focal length of the second lens group.

In the zoom lens according to the second present invention, it is preferable that the following conditional expression is satisfied.

$$-0.180 < f4/ft < -0.140$$

however,
where ft denotes a focal length in the telephoto end state of the zoom lens, and
f4 denotes a focal length of the fourth lens group.

In the zoom lens according to the second present invention, it is preferable that the fourth lens group is composed of a cemented lens of one positive lens and one negative lens.

In a zoom lens according to a third present invention comprises, in order on an optical axis from an object, a first lens group having positive refractive power, a second lens group having negative refractive power, a third lens group having positive refractive power, a fourth lens group having negative refractive power, and a fifth lens group having positive refractive power, and the first lens group, the second lens group, the third lens group, the fourth lens group, and the fifth lens group respectively move on the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state, and the following conditional expression is satisfied.

$$-0.90 < f2/TL2 < -0.60$$

$$-0.180 < f4/ft < -0.140$$

however,
where f2 denotes a focal length of the second lens group,
TL2 denotes a length of the second lens group on the optical axis,
f4 denotes a focal length of the fourth lens group, and
ft denotes a focal length in the telephoto end state of the zoom lens.

In the zoom lens according to the third present invention, it is preferable that the following conditional expression is satisfied.

$$-0.180 < (f1 \times fw)/(f2 \times ft) < -0.160$$

however,
where f1 denotes a focal length of the first lens group, and
fw denotes a focal length in the wide-angle end state of the zoom lens.

In the zoom lens according to the third present invention, it is preferable that the fourth lens group is composed of a cemented lens of one positive lens and one negative lens.

An optical device according to the first present invention is an optical device equipped with a zoom lens forming an image of an object on a predetermined surface, wherein the optical device uses, as the zoom lens, the zoom lens according to the first present invention. Similarly, an optical device according to the second present invention is an optical device, which is equipped with a zoom lens forming an image of an object on a predetermined surface, wherein the zoom lens is configured with the second present zoom lens, while a third present optical device is an optical device equipped with a zoom lens forming an image of an object on a predetermined surface, wherein the zoom lens is configured to have the zoom lens according to the third present invention.

A method for manufacturing a zoom lens according to the first present invention, the method comprises the steps of: disposing, in order on an optical axis from an object, a first lens group having positive refractive power, a second lens group having negative refractive power, a third lens group having positive refractive power, a fourth lens group having negative refractive power, and a fifth lens group having positive refractive power; and respectively moving on the optical axis, the first lens group, the second lens group, the third lend group, the fourth lens group, and the fifth lens group so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state, so that the following conditional expression is satisfied.

$$0.25 < f1/ft < 0.38$$

however,
where f1 denotes a focal length of the first lens group, and
ft denotes a focal length in the telephoto end state of the zoom lens.

A method for manufacturing a zoom lens according to the second present invention, the method comprises the steps of: disposing, in order on an optical axis from an object, a first lens group having positive refractive power, a second lens group having negative refractive power, a third lens group having positive refractive power, a fourth lens group having negative refractive power, and a fifth lens group having positive refractive power; respectively moving the first lens group, the second lens group, the third lend group, the fourth lens group, and the fifth lens group on the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state, disposing, in order on an optical axis from an object, a first negative lens, a second negative lens, a positive lens, and a third negative lens as the second lens group; and cementing the positive lens with the third negative lens.

A method for manufacturing a zoom lens according to the third present invention, the method comprises the steps of: disposing, in order on an optical axis from an object, a first lens group having positive refractive power, a second lens group having negative refractive power, a third lens group having positive refractive power, a fourth lens group having negative refractive power, and a fifth lens group having positive refractive power; and respectively moving the first lens group, the second lens group, the third lend group, the fourth lens group, and the fifth lens group on the optical axis upon zooming from a wide-angle end state to a telephoto end state, so that a distance between the first lens group and the second lens group, a distance between the second lens group and the third lens group, a distance between the third lens group and the fourth lens group, and a distance between the fourth lens group and the fifth lens group respectively change, so that the following conditional expression is satisfied.

$$-0.90 < f2/TL2 < -0.60$$

$$-0.180 < f4/ft < -0.140$$

however,
where f2 denotes a focal length of the second lens group,
TL2 denotes a length of the second lens group on the optical axis,
f4 denotes a focal length of the fourth lens group, and
ft denotes a focal length in the telephoto end state of the zoom lens.

Advantageous Effects of the Invention

According to any one of the present inventions, it is possible to provide a zoom lens, an optical device, and a method for manufacturing the zoom lens having a large zoom ratio although this is small, and excellent optical performance.

BRIEF DESCRIPTION OF THE DRAWINGS

FIG. 2A depicts graphs showing various aberrations upon focusing on infinity in the wide-angle state end of the zoom lens according to Example 1, FIG. 2C depicts graphs showing various aberrations upon focusing on infinity in the telephoto end state.

FIG. 4A depicts graphs showing various aberrations upon focusing on infinity in the wide-angle state end of the zoom lens according to Example 2, FIG. 4B depicts graphs showing various Aberrations upon focusing on infinity in the intermediate end state, and FIG. 4C depicts graphs showing various aberrations upon focusing on infinity in the telephoto end state.

FIG. 6A depicts graphs showing various aberrations upon focusing on infinity in the wide-angle state end of the zoom lens according to Example 3, FIG. 6B depicts graphs showing various Aberrations upon focusing on infinity in the intermediate end state, and FIG. 6C depicts graphs showing various aberrations upon focusing on infinity in the telephoto end state.

FIG. 8 is a sectional view along an arrow A-A' in FIG. 7A.

DESCRIPTION OF THE EMBODIMENTS
(FIRST TO THIRD EMBODIMENTS)

Figure 7A:
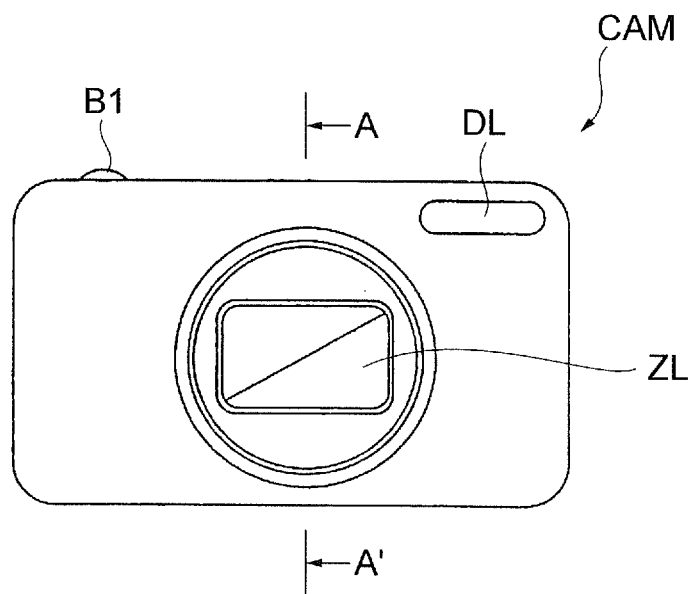
FIG. 7A is a front view of a digital still camera.
Figure 7B:
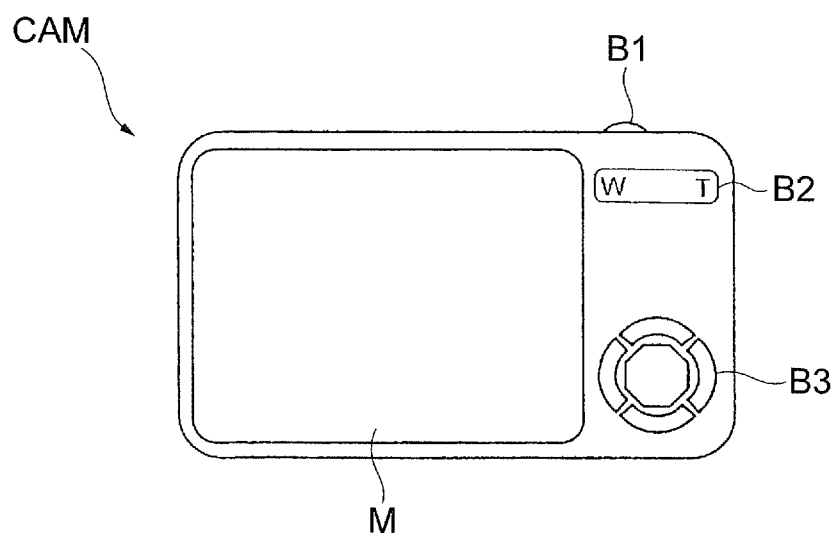
FIG. 7B is a rear view of the digital still camera.

A first embodiment will be now described with reference to the drawings. FIGS. 7A and 7B and FIG. 8 illustrate a first embodiment digital still camera CAM equipped with a zoom lens according to the first embodiment. In FIGS. 7A and 7B, FIG. 7A illustrates a front view of the digital still camera CAM, and FIG. 7B illustrates a rear view of the digital still camera CAM. FIG. 8 illustrates a sectional view along an arrow A-A' in FIG. 7A.

In the digital still camera CAM shown in FIGS. 7A and 7B, when pushing a power button not illustrated, a not illustrated shutter of a photographing lens (ZL) opens so that light from a photographic subject (object) are collected by the photographing lens (ZL) collects, and form an image on an imaging element C (for example, a CCD or CMOS, etc.) disposed on an image surface I illustrated in FIG. 8. The image of the photographic subject formed by the imaging element C is displayed on a liquid crystal display monitor M provided behind the digital still camera CAM. A photographer shoot, after deciding a composition of the image of the photographic subject while looking at the liquid crystal display monitor M, the image of the photographing subject by pressing a shutter release button B1, and record it to a not illustrated memory.

The photographing lens is composed of the zoom lenses ZL according to the below-mentioned first embodiment. Moreover, the digital still camera CAM comprises a fill light emitting unit DL which emits fill light if the photographic subject looks dark, a wide (W) to tele (T) button for zooming the photographing lens (zoom lens ZL) from the wide-angle state end (W) to the telephoto end state (T), a function button B3 used for various conditional settings, etc. of the digital still camera CAM, and the like.

Figure 1A:
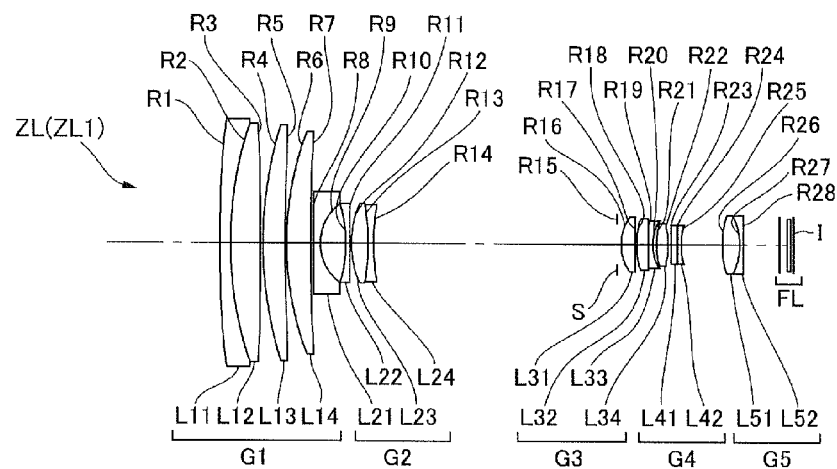
FIG. 1A is a lens configuration diagram in a wide-angle end state of a zoom lens according to Example 1.
Figure 1B:
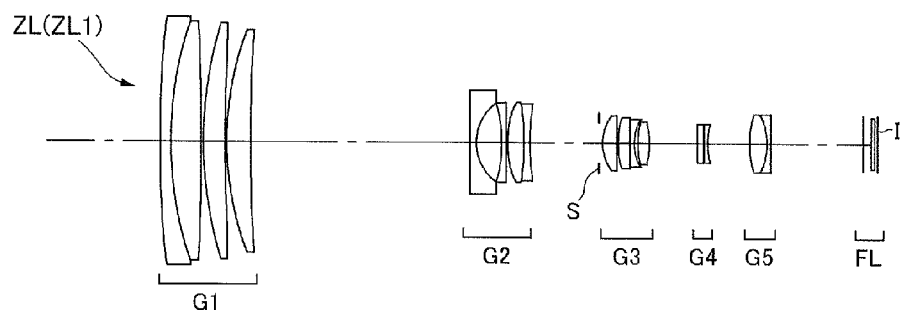
FIG. 1B is a lens configuration diagram in an intermediate focal length state.
Figure 1C:
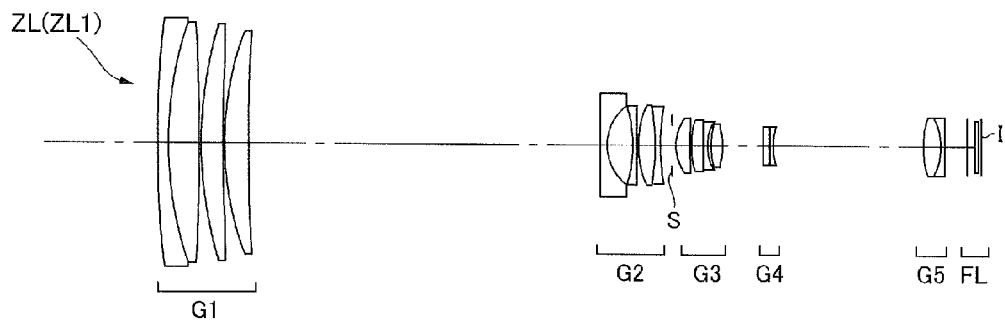
FIG. 1C is a lens configuration diagram in a telephoto end state.

The zoom lens ZL according to the first embodiment is composed of, in order on the optical axis as illustrated in FIGS. 1A to 1C, a first lens group G1 having positive refractive power, a second lens group G2 having negative refractive power, a third lens group G3 having positive refractive power, a fourth lens group G4 having negative refractive power, and a fifth lens group G5 having positive refractive power. Upon zooming from the wide-angle end state to the telephoto end state, the first lens group G1, the second lens group G2, the third lens group G3, the fourth lens group G4, and the fifth lens group G5 respectively move on the optical axis so that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 respectively change. In the zoom lens ZL a condition denoted by the following conditional expression (1) is satisfied.

$$0.25 < f1/ft < 0.38 \qquad (1)$$

however,
where f1 denotes a focal length of the first lens group G1, and
ft denotes a focal length in the telephoto end state of the zoom lens ZL.

The conditional expression (1) is a conditional expression which defines the focal length of the first lens group G1 against the focal length in the telephoto end state of a whole system of the zoom lens ZL. By satisfying the conditional expression (1), this enables to decrease a telephoto ratio in the telephoto end state, and shorten a total length of the zoom lens ZL. With this arrangement, it is possible to realize the zoom lens ZL having a large zoom ratio although this is small, and excellent optical performance. Note that in case of a condition of exceeding an upper limit of the conditional expression (1), this causes enlargement of the zoom lens ZL. When trying to downsize the zoom lens ZL with the condition of exceeding the upper limit of the conditional expression (1), it is necessary to increase the refractive power of the third lens group G3 since the refractive power of the first lens group G1 will become small, thus it is not appreciated because spherical aberration is greatly generated in a minus side in a whole zooming region. On the other hand, in case of a condition of deceeding a lower limit of the conditional expression (1), the refractive power of the first lens group G1 will becomes large and spherical aberration and image surface curvature are generated greatly in a minus side in the telephoto end state, it is not preferable.

In order to further ensure the advantageous effect of the first embodiment, it is appreciated that the upper limit of the conditional expression (1) is set to 0.34. Moreover, it is further appreciated that the upper limit of the conditional expression (1) is set to 0.33. Meanwhile, in order to further ensure the advantageous effect, it is appreciated that the lower limit of the conditional expression (1) is set to 0.30.

In the zoom lens ZL according to the first embodiment, it is appreciated to a condition denoted by the following conditional expression (2) is satisfied.

$$-0.180 < (f1 \times fw)/(f2 \times ft) < -0.160 \quad (2)$$

however,
where fw denotes a focal length in the wide-angle end state of the zoom lens ZL, and
f2 denotes a focal length of the second lens group G2.

The conditional expression (2) is a conditional expression which defines the focal length of the first lens group G1 against the focal length of the second lens group G2. By satisfying the conditional expression (2), it is possible to achieve the small zoom lens ZL having high image-forming performance. Note that in case of a condition of exceeding an upper limit of the conditional expression (2), spherical aberration is generated greatly in a minus side in the telephoto end state, it is not preferable. On the other hand, in case of a condition of deceeding a lower limit of the conditional expression (2), spherical aberration is generated greatly in a plus side in the telephoto end state, it is not preferable.

In order to further ensure the advantageous effect of the first embodiment, it is preferable that the upper limit of the conditional expression (2) is set to −0.167. Meanwhile, in order to further ensure the advantageous effect of the first embodiment, it is preferable that the lower limit of the conditional expression (2) is set to −0.176.

In the zoom lens ZL according to the first embodiment, it is appreciated that the first lens group G1 has three positive lenses. With this arrangement, it is possible to properly correct spherical aberration and coma aberration in the telephoto end state.

In the zoom lens ZL according to the first embodiment, it is appreciated that the first lens group G1 has a cemented lens composed of a positive lens and a negative lens, and conditions denoted by the following conditional expression (3) and the conditional expression (4) are satisfied.

$$0.367 < nN1 - nP1 \quad (3)$$

$$80 < vP1 \quad (4)$$

however,
where nN1 denotes refractive index to a d-line of the negative lens which configures the cemented lens of the first lens group G1,
nP1 denotes refractive index to a d-line of the positive lens which configures the cemented lens of the first lens group G1, and
vP1 denotes an Abbe number of the positive lens which configures the cemented lens of the first lens group G1.

The conditional expression (3) is a conditional expression which defines a difference of the refractive indexes between the positive lens and negative lens which configures the cemented lens of the first lens group G1. By satisfying the conditional expression (3), this enables to properly correct spherical aberration which is generated in the first lens group G1. In case of a condition of deceeding a lower limit of the conditional expression (3), a difference of the refractive indexes between the positive lens and the negative lens configures the cemented lens of the first lens group G1 becomes too small, and curvature due to spherical aberration becomes large in the telephoto end state, thus it is not preferable.

In order to further ensure the advantageous effect of the first embodiment, it is appreciated that the lower limit of the conditional expression (3) is set to 0.370.

A conditional expression (4) is a conditional expression which defines an Abbe number of the positive lens which configures the cemented lens of the first lens group G1. By satisfying the conditional expression (4), it is possible to properly correct axial chromatic aberration and chromatic aberration of magnification in the telephoto end state. Note that in case of a condition of deceeding the lower limit of the conditional expression (4), axial chromatic aberration is generated greatly in a minus side in the telephoto end state, and chromatic aberration of magnification is generated greatly in a plus side, it is not preferable.

In order to further ensure the advantageous effect of the first embodiment, it is appreciated that the lower limit of the conditional expression (4) is set to 90. Note that since the positive lens, with which the conditional expression (4) is satisfied, is soft and is easily damaged, it is appreciated that the negative lens is arranged and cemented on the object side of the positive lens. With this arrangement, since a lens surface on the object side of the positive lens is covered with the negative lens, the lens surface on the object side of the positive lens, with which the conditional expression (4) is satisfied, is not easily damaged with flaws.

In the zoom lens ZL according to the first embodiment, it is appreciated that a condition denoted by the following conditional expression (5) is satisfied.

$$-0.18 < f4/ft < -0.14 \quad (5)$$

however,
where f4 denotes a focal length of the fourth lens group 4.

The conditional expression (5) is a conditional expression which defines a focal length of the fourth lens group G4 against the focal length in the telephoto end state of the whole system of the zoom lens ZL. By satisfying the conditional expression (5), it is possible to reduce a diameter of a front objective lens of the zoom lens ZL. Note that in case of a condition of exceeding the upper limit of the conditional expression (5), spherical aberration is generated greatly in a plus side in the wide-angle end state, it is not preferable. On the other hand, in case of a condition of deceeding the lower limit of the conditional expression (5), this condition reduces the advantageous effect of the negative lens closer to the image side than an aperture stop S, thus it becomes difficult to sufficiently reduce the diameter of the front object lens of the zoom lens ZL.

In order to further ensure the advantageous effect of the first embodiment, it is appreciated that the upper limit of the conditional expression (5) is set to −0.15. Meanwhile, in order to further ensure the advantageous effect of the first embodiment, it is appreciated that the lower limit of the conditional expression (5) is set to −0.17.

In the zoom lens ZL according to the first embodiment, it is appreciated that the fourth lens group G4 is composed of one positive lens and one negative lens. With this arrangement, it is possible to properly correct axial chromatic aberration in the fourth lens group G4 itself, thus it becomes easy to correct axial chromatic aberration in the whole system of the zoom lens ZL. Moreover, this enables to reduce degradation of performance when the fourth lens group G4 is eccentrically arranged. Note that the fifth lens group G5 may be composed of a cemented lens of one positive lens and one negative lens, with this arrangement, it is possible to obtain the same advantageous effect as that of the fourth lens group G4.

In the zoom lens ZL according to the first embodiment, it is appreciated that the aperture stop S is disposed in the neighborhood of the object side of the third lens group G3, and the following conditional expression (6) is satisfied.

$$0.084 < \Delta Zwt/ft < 0.090 \quad (6)$$

however,
where ΔZwt denotes a moving distance on the optical axis to the object side of the aperture stop S upon zooming from the wide-angle end state to the telephoto end state.

A conditional expression (6) is a conditional expression which defines a moving distance on the optical axis to the object side of the aperture stop S upon zooming from the wide-angle end state to the telephoto end state against the focal length in the telephoto end state of the whole system of the zoom lens ZL. Generally, the variate of a F number upon zooming becomes larger as the moving distance on the optical axis of the aperture stop S becomes larger. Then, by satisfying the conditional expression (6), it is possible to ensure a large zoom ratio by increasing the focal length of the whole system in the telephoto end state while setting the variate of the F number upon zooming from the wide-angle end state to the telephoto within an appropriate range. Note that in case of a condition of exceeding the upper limit of the conditional expression (6), the F number in the wide-angle end state becomes larger more than necessary, or the F number in the telephoto end state becomes small, then it becomes difficult to correct spherical aberration, thus it is not preferable. On the other hand, in case of a condition of deceeding the lower limit of the conditional expression (6), when trying to decrease the F number in the wide-angle end state, the F number in the telephoto end state decreases, then it becomes difficult to correct spherical aberration, thus it is not preferable.

In order to further ensure the advantageous effect of the first embodiment, it is preferable that the upper limit of the conditional expression (6) is set to 0.088. On the other hand, in order to further ensure the advantageous effect of the first embodiment, it is preferable that the lower limit of the conditional expression (6) is set to 0.086.

Figure 9:
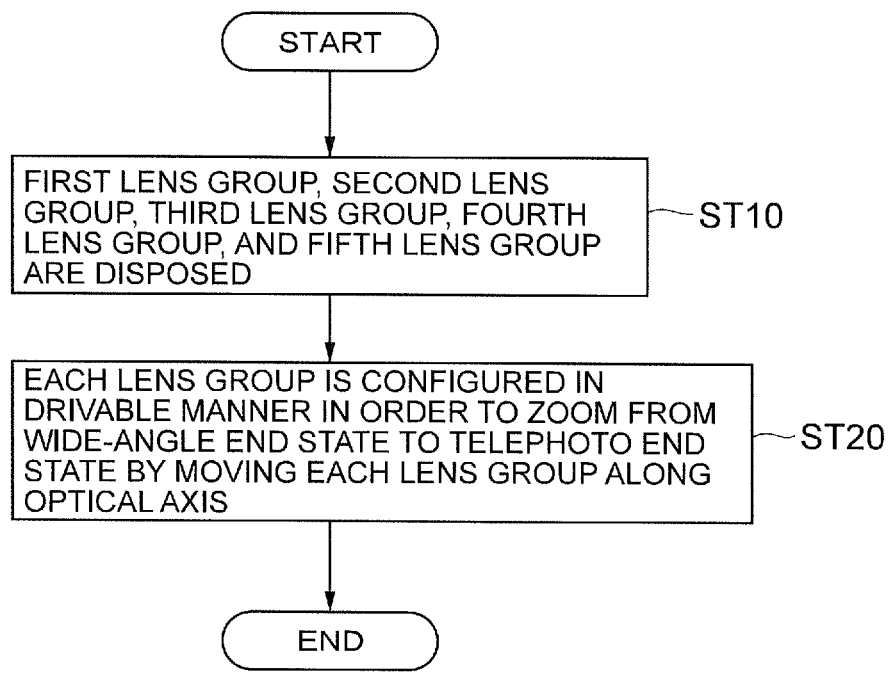
FIG. 9 illustrates a flowchart showing a method for manufacturing the zoom lens according to the first embodiment.

Here, a method for manufacturing the zoom lens ZL according to the first embodiment is described with reference to FIG. 9. Firstly, the first lens group G1 having positive refractive power, the second lens group G2 having negative refractive power, the third lens group G3 having positive refractive power, the fourth lens group G4 having negative refractive power, and the fifth lens group G5 having positive refractive power are incorporated in a cylindrical lens-barrel in order from the object (Step ST10). The first lens group G1, the second lens group G2, the third lens group G3, the fourth lens group G4, and the fifth lens group G5 are configured in a drivable manner so that zooming from the wide-angle end state to the telephoto end state is performed by moving the first lens group G1, the second lens group G2, the third lens group G3, the fourth lens group G4, and the fifth lens group G5 along the optical axis (Step ST20).

In Step ST10 a lens is incorporated, the first lens group G1, the second lens group G2, the third lens group G3, the fourth lens group G4, and the fifth lens group G5 are arranged so that the conditional expression (1), etc. mentioned before are satisfied. According to such a manufacturing method, it is possible to obtain the zoom lens ZL having a large zoom ratio although this is small, and excellent optical performance.

Next, a second embodiment is described with reference to the drawings. A digital still camera CAM equipped with a zoom lens ZL according to the below-mentioned second embodiment is illustrated in FIGS. 7A and 7B, and FIG. 8. This digital still camera CAM has the same configurations as those of the first embodiment and have already been described, thus descriptions thereof are omitted.

The zoom lens ZL according to the second embodiment is configured to comprise, for example as illustrated in FIGS. 1A to 1C, in order on an optical axis from an object, a first lens group G1 having positive refractive power, a second lens group G2 having negative refractive power, a third lens group G3 having positive refractive power, a fourth lens group G4 having negative refractive power, and a fifth lens group G5 having positive refractive power. The first lens group G1, the second lens group G2, the third lens group G3, the fourth lens group G4, and the fifth lens group G5 respectively move along the optical axis so that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 respectively change upon zooming from a wide-angle to a telephoto end state.

The second lens group G2 is composed of, in order on the optical axis from the object, a first negative lens, a second negative lens, a positive lens, and a third negative lens, and the positive lens and the third negative lens are cemented each other. With this arrangement, it is possible to properly correct chromatic aberration of magnification in the wide-angle end state, and additionally reduce fluctuation of chromatic aberration upon zooming from the wide-angle end state to the telephoto end state. Therefore, this enables to realize the zoom lens ZL having a large zoom ratio although this is small, and equipped with excellent optical performance.

In the zoom lens ZL according to the second embodiment, it is appreciated that a condition denoted by the following conditional expression (7) is satisfied.

$$-0.180<(f1\times fw)/(f2\times ft)<-0.160 \tag{7}$$

however, where fw denotes a focal length in the wide-angle end state of the zoom lens ZL, ft denotes a focal length in the telephoto end state of the zoom lens ZL, f1 denotes a focal length of the first lens group G1, and f2 denotes a focal length of the second lens group G2.

The conditional expression (7) is a conditional expression which defines the focal length of the first lens group G1 against the focal length of the second lens group G2. By satisfying the conditional expression (7), it is possible to achieve the small zoom lens ZL having high image-forming performance. Note that in case of a condition of exceeding the upper limit of the conditional expression (7), spherical aberration is generated greatly in a minus side in the telephoto end state, it is not preferable. Meanwhile, in case of a condition deceeding the lower limit of the conditional expression (7), spherical aberration is generated greatly in a plus side in the telephoto end state, it is not preferable.

In order to further ensure the advantageous effect of the second embodiment, it is appreciated that the upper limit of the conditional expression (7) is set to −0.167. On the other hand, in order to further ensure the advantageous effect of the second embodiment, it is appreciated that the lower limit of the conditional expression (7) is set to −0.176.

In the zoom lens ZL according to the second embodiment, it is appreciated that a condition denoted by the following conditional expression (8) is satisfied.

$$-0.180<f4/ft<-0.140 \tag{8}$$

however, where ft denotes a focal length in the telephoto end state of the zoom lens ZL, and f4 denotes a focal length of the fourth lens group G4.

The conditional expression (8) is a conditional expression which defines the focal length of the fourth lens group G4 against the focal length in the telephoto end state of the whole system of the zoom lens ZL. By satisfying the conditional expression (8), it is possible to reduce a diameter of a front objective lens of the zoom lens ZL. Note that in case of a condition of exceeding the upper limit of the conditional expression (8), spherical aberration is generated greatly in a plus side in the wide-angle end state, it is not preferable. On the other hand, in case of a condition of deceeding the lower limit of the conditional expression (8), this reduces the advantageous effect of the negative lens closer to the image side than the aperture stop S, thus it becomes difficulty to sufficiently reduce a diameter of the front objective lens of the zoom lens ZL.

In order to further ensure the advantageous effect of the second embodiment, it is appreciated that the upper limit of the conditional expression (8) is set to −0.150. Meanwhile, in order to further ensure the advantageous effect of the second embodiment, it is appreciated that the lower limit of the conditional expression (8) is set to −0.170.

In the zoom lens ZL according to the second embodiment, it is preferable that the fourth lens group G4 is composed of a cemented lens of one positive lens of one negative lens.

With this arrangement, it is possible to properly correct axial chromatic aberration in the fourth lens group itself, and easily correct axial chromatic aberration of the whole system of the in the zoom lens ZL. Moreover, it is possible to reduce degradation of performance when the fourth lens group G4 is eccentrically arranged. Note that the fifth lens group G5 may be configured of a cemented lens of one positive lens and one negative lens, and with this arrangement, it is possible to obtain the same advantageous effect as that of the fourth lens group G4.

Figure 10:
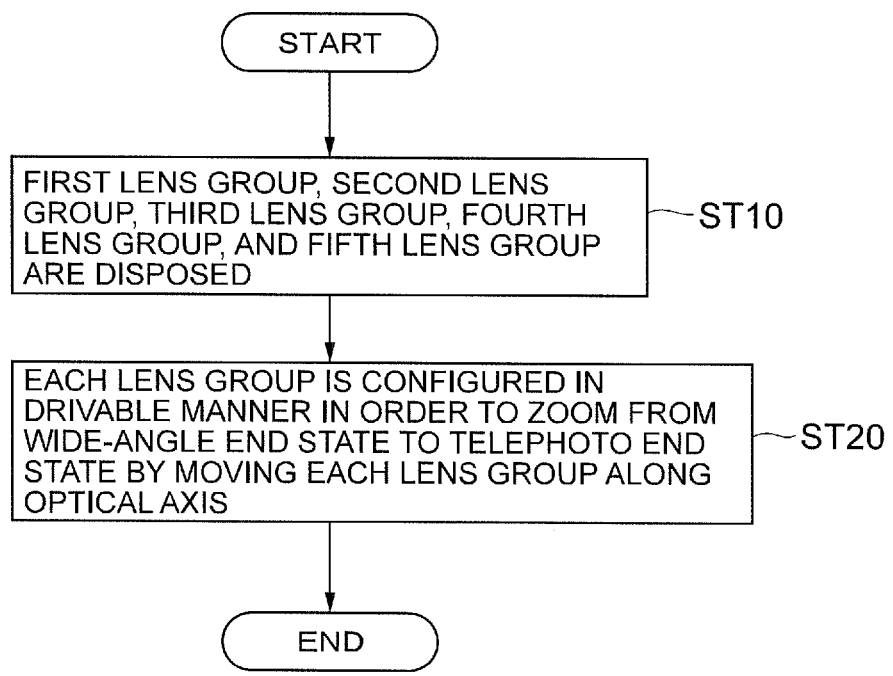
FIG. 10 illustrates a flowchart showing a method for manufacturing the zoom lens according to the second embodiment.

Here, a method for manufacturing the zoom lens ZL according to the second embodiment is explained with reference to FIG. 10. Firstly, the first lens group G1 having positive refractive power, the second lens group G2 having negative refractive power, the third lens group G3 having positive refractive power, the fourth lens group G4 having negative refractive power, and the fifth lens group G5 having positive refractive power are incorporated in a cylindrical lens-barrel in order from the object (Step ST10). The first lens group G1, the second lens group G2, the third lens group G3, the fourth lens group G4, and the fifth lens group G5 are configured in a drivable manner by moving the first lens group G1, the second lens group G2, the third lens group G3, the fourth lens group G4, and the fifth lens group G5 along the optical axis so that zooming is performed from the wide-angle end state to the telephoto end state (Step ST20).

In Step ST10 for incorporating lenses, a first negative lens, a second negative lens, a positive lens, a third negative lens are disposed, as the second lens group G2, in order on the optical axis from the object. According to such a manufacturing method, it is possible to obtain the zoom lens ZL having a large zoom ratio although this is small, and equipped with excellent optical performance.

Next, the third embodiment is described with referred to drawings. A digital still camera CAM comprising the zoom lens ZL according to the below-mentioned third embodiment is illustrated in FIGS. 7A and 7B, and FIG. 8. This digital still camera CAM has the same configurations as those of the first embodiment, and the configurations are already described, thus descriptions thereof are now omitted.

The zoom lens ZL according to the third embodiment is configured to comprise, as illustrated for example in FIGS. 1A to 1C in order on an optical axis from an object, a first lens group G1 having positive refractive power, a second lens group G2 having negative refractive power, a third lens group G3 having positive refractive power, a fourth lens group G4 having negative refractive power, and a fifth lens group G5 having positive refractive power. The first lens group G1, the second lens group G2, the third lens group G3, the fourth lens group G4, and the fifth lens group G5 respectively move along the optical axis so that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 respectively change upon zooming from the wide-angle end state to the telephoto end state. In the zoom lens ZL, conditions denoted by the following conditional expressions (9) and (10) are satisfied.

$$-0.90<f2/TL2<-0.60 \tag{9}$$

$$-0.180<f4/ft<-0.140 \tag{10}$$

however, where f2 denotes a focal length of the second lens group G2,

TL2 denotes a distance on the optical axis of the second lens group G2, f4 denotes a focal length of the fourth lens group G4, and ft denotes a focal length in the telephoto end state of the zoom lens ZL.

By satisfying the conditional expressions (9) and (10), it is possible to realize the zoom lens ZL having a large zoom ratio although this is small, and equipped with excellent optical performance.

The conditional expression (9) is a conditional expression which defines a focal length of the second lens group G2 against the length on the optical axis of the second lens group G2. By satisfying the conditional expression (9), it is possible to ensure, when zooming the second lens group G2, the variate of a moving distance without the total length of the zoom lens ZL increased, by reducing a length of the second lens group G2 on the optical axis. Note that in case of a condition of deceeding the lower limit of the conditional expression (9), the length of the second lens group G2 becomes large and the optical total length becomes large, or the focal length of the second lens group G2 becomes short, thus spherical aberration is generated greatly in a plus side in the telephoto end state, thus it is not preferable. On the other hand, in case of a condition of exceeding the upper limit of the conditional expression (9), the focal length of the second lens group G2 becomes large, the variate of a moving distance of the second lens group G2 becomes large in order to secure a zoom ratio, and it causes enlargement of the zoom lens ZL. When trying to downsize the zoom lens ZL on a condition of exceeding the upper limit of the conditional expression (9), it is necessary to improve refractive powers of the third lens group G3 and the fourth lens group G4, and telephoto ratios in the third lens group G3 and the fourth lens group G4 are necessary to be decreased, thus spherical aberration is generated greatly in a minus side in a whole zooming range, it is not preferable.

In order to further ensure the advantageous effect of the third embodiment, it is preferable that the upper limit of the conditional expression (9) is set to −0.69. Moreover, it is further appreciated that the upper limit of the conditional expression (9) is set to −0.72. Meanwhile, in order to further ensure the advantageous effect of the third embodiment, it is preferable that the lower limit of the conditional expression (9) is set to −0.81. Moreover, it is more preferable that the lower limit of the conditional expression (9) is set to −0.77.

The conditional expression (10) is a conditional expression which defines the focal length of the fourth lens group G4 against the focal length in the telephoto end state of the zoom lens ZL. By satisfying the conditional expression (10), it is possible to reduce a diameter of a front objective lens of the zoom lens ZL. Note that in case of a condition of exceeding the upper limit of the conditional expression (10), spherical aberration is generated greatly in a plus side in the wide-angle end state, it is not preferable. On the other hand, in case of a condition of deceeding the lower limit of the conditional expression (10), the advantageous effect of the negative lens closer to the image than the aperture-stop S is reduced, thus it is difficult to sufficiently reduce a diameter of a front objective lens of the zoom lens ZL.

In order to further ensure the advantageous effect of the third embodiment, it is preferable that the upper limit of a conditional expression (10) is set to −0.150. Meanwhile, in order to further ensure the advantageous effect of the third embodiment, it is preferable that the lower limit of the conditional expression (10) is set to −0.170.

In the zoom lens ZL according to the third embodiment, it is appreciated that a condition denoted by the following conditional expression (11) is satisfied.

$$-0.180 < (f1 \times fw)/(f2 \times ft) < -0.160 \quad (11)$$

however, where f1 denotes a focal length of the first lens group G1, and fw denotes a focal length in the wide-angle end state of the zoom lens ZL.

The conditional expression (11) is a conditional expression which defines the focal length of the first lens group G1 against the focal length of the second lens group G2. By satisfying the conditional expression (11), it is possible to achieve the small zoom lens ZL having high image-forming performance. Note that in case of a condition of exceeding the upper limit of the conditional expression (11), spherical aberration is generated greatly in a minus side in the telephoto end state, thus it is not preferable. Meanwhile, in case of a condition of deceeding the lower limit of the conditional expression (11), spherical aberration is generated greatly in a plus side in the telephoto end state, thus it is not preferable.

In order to further ensure the advantageous effect of the third embodiment, it is preferable to set the upper limit of the conditional expression (11) is set to −0.167. On the other hand, in order to further ensure the advantageous effect of the third embodiment, it is preferable that the lower limit of the conditional expression (11) is set to −0.176.

In the zoom lens ZL according to the third embodiment, it is appreciated that the fourth lens group G4 is composed of a cemented lens of one positive lens and one negative lens. With this arrangement, it is possible to properly correct axial chromatic aberration in the fourth lens group G4 itself, thus this makes easier to properly correct axial chromatic aberration in a whole system of the zoom lens ZL. Moreover, this enables to reduce degradation of performance when the fourth lens group G4 is eccentrically arranged. Note that the fifth lens group G5 may be composed of a cemented lens of one positive lens and one negative lens, and with this arrangement it is possible to obtain the same advantageous effect as that of the fourth lens group G4.

In the zoom lens ZL according to the third embodiment, it is preferable that the conditions denoted by the following conditional expression (12) is satisfied.

$$0.20 < (n2f \times ft)/(v2f \times r2f) < 1.00 \quad (12)$$

however, where n2f denotes refractive index against a d-line of a lens closest to an image in the second lens group G2, ft denotes a focal length in the telephoto end state of the zoom lens ZL, v2f denotes an Abbe number of the lens closest to the image in the second lens group G2, and r2f denotes a radius of curvature of a lens surface closest to the image in the second lens group G2.

The conditional expressions (12) is a conditional expression which defines refractive index to a d-line of the lens closest to the image in the second lens group G2, and a radius of curvature of the lens surface closest to the image. By satisfying the conditional expression (12), it is possible to shorten the total length of the zoom lens ZL in the telephoto end state while maintaining the excellent optical performance. Note that in case of a condition of exceeding the upper limit of the conditional expression (12), this enables to reduce a radius of the lens surface closest to the object in the second lens group G2. In this case, since it is necessary to extend a distance between the second lens group G2 and aperture-stop S in the telephoto end state, and the total length of the zoom lens ZL becomes larger in the telephoto end state, it is not preferable. On the other hand, in case of a condition of deceeding the lower limit of the conditional expression (12), curvature of an image surface is generated greatly in a plus side in the wide-angle end state, it is not preferable.

In order to further ensure the advantageous effect of the third embodiment, it is preferable that the upper limit of the conditional expression (12) is set to 0.73. Moreover, it is more preferable that the upper limit of the conditional expression (12) is set to 0.50. On the other hand, in order to further ensure the advantageous effect of the third embodiment, it is preferable that the lower limit of the conditional expression (12) is set to 0.29. Moreover, it is more preferable that the lower limit of the conditional expression (12) is set to 0.35.

Figure 11:
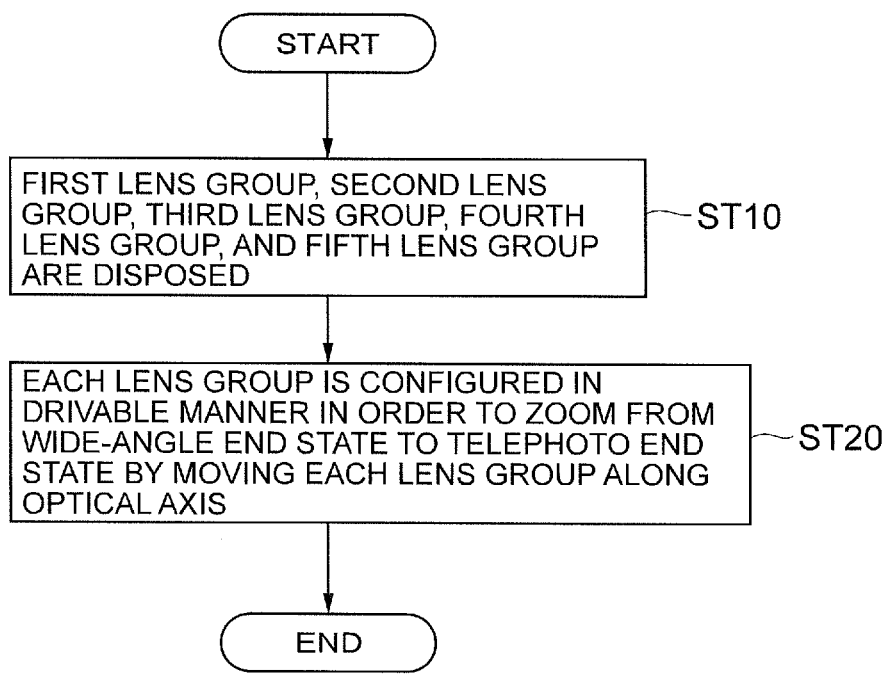
FIG. 11 illustrates a flowchart showing a method for manufacturing the zoom lens according to the third embodiment.

Here, a method for manufacturing the zoom lens ZL according to the third embodiment is described with reference to FIG. 11. Firstly, the first lens group G1 having positive refractive power, the second lens group G2 having negative refractive power, the third lens group G3 having positive refractive power, the fourth lens group G4 having negative refractive power, and the fifth lens group G5 having positive refractive power are incorporated in order from an object in a cylindrical lens-barrel (Step ST10). The first lens group G1, the second lens group G2, the third lens group G3, the fourth lens group G4, and the fifth lens group G5 are configured in a drivable manner so that zooming from the wide-angle end state to the telephoto end state is performed by moving the first lens group G1, the second lens group G2, third lens group G3, the fourth lens group G4, and the fifth lens group G5 on the optical axis (Step ST20).

In Step ST10 for incorporating lenses, the first lens group G1, the second lens group G2, the third lens group G3, the fourth lens group G4, and the fifth lens group G5 are disposed so that the conditional expressions (9) and (10) are satisfied. According to such a manufacturing method, it is possible to obtain the zoom lens ZL having a large zoom ratio although this is small, and equipped with excellent optical performance.

EXAMPLES ACCORDING TO FIRST TO THIRD EMBODIMENTS

Example 1

Hereinafter, each example of the present application is explained based on accompanying drawings. Firstly, Example 1 of the present application is described using FIGS. 1A to 1C, FIGS. 2A to 2C, and Table 1. FIG. 1A illustrates a lens configuration diagram in the wide-angle end state of the zoom lens ZL (ZL1) according to Example 1, FIG. 1B illustrates a lens configuration diagram in the intermediate focal length state, and FIG. 1C illustrates a lens configuration diagram in the telephoto end state. The zoom lens ZL1 according to Example 1 is configured to comprise, in order on the optical axis from the object a first lens group G1 having positive refractive power, a second lens group G2 having negative refractive power, a third lens group G3 having positive refractive power, a fourth lens group G4 having negative refractive power, and a fifth lens group G5 having positive refractive power. The first lens group G1, the second lens group G2, the third lens group G3, the fourth lens group G4, and the fifth lens group G5 respectively move along the optical axis, so that upon zooming from the wide-angle end state to the telephoto end state, a distance between the first lens group G1 and the second lens group G2 increases, a distance between the second lens group G2 and the third lens group G3 decreases, a distance between third lens group G3 and the fourth lens group G4 changes, and a distance between the fourth lens group G4 and the fifth lens group G5 changes.

The first lens group G1 is composed of, in order on the optical axis from the object, a meniscus negative lens L11 having a convex surface facing the object, a biconvex first positive lens L12, a meniscus second positive lens L13 having a convex surface facing the object, and a meniscus third positive lens L14 having a convex surface facing the object. In the first lens group G1, the negative lens L11 and the first positive lens L12 are cemented each other.

The second lens group G2 is composed of, in order on the optical axis from the object, a first negative lens L21 having a concave surface facing an image surface I, a biconcave second negative lens L22, a biconvex positive lens L23, and a biconcave third negative lens L24. In the second lens group G2, the positive lens L23 and the third negative lens L24 are cemented each other.

The third lens group G3 is composed of a biconvex first positive lens L31, a biconvex second positive lens L32, a biconcave negative lens L33, and a biconvex third positive lens L34. In third lens group G3, the second positive lens L32 and the negative lens L33 are cemented each other. Moreover, both sides of lens surfaces regarding the first positive lens L31 have an aspherical surface.

The fourth lens group G4 is composed of, in order on the optical axis from the object, a biconvex positive lens L41, and a biconcave negative lens L42. In the fourth lens group G4, the positive lens L41 and the negative lens L42 are cemented each other.

The fifth lens group G5 is composed of, in order on the optical axis from the object, a biconvex positive lens L51, and a meniscus negative lens L52 having a convex surface facing an image surface I. In the fifth lens group G5, the positive lens L51 and the negative lens L52 are cemented each other. Moreover, the lens surface on the object side of the positive lens L51 has an aspherical surface.

The aperture stop S is disposed in the neighborhood of the object side of the third lens group G3, and moves, upon zooming from the wide-angle end state to the telephoto end state, on the same trajectory as that of the third lens group G3. Note that focusing from an infinity object to a point-blank range object (finite distance object) is performed by moving the fifth lens group G5 to the object side on the optical axis. Moreover, a filter group FL arranged between the fifth lens group G5 and the image surface I is composed of a low-pass filter, an infrared cut filter, etc.

Tables 1 to 3 are now illustrated below, these are tables respectively showing values of data of the zoom lens according to Examples 1 to 3. [General Data] of each table respectively shows a focal length f, a F number FNO, a half angle of view ω, and an image height Y of the zoom lens ZL in each state of the wide-angle end state, the intermediate focal length state, and the telephoto end state. Moreover, in [Lens Data], the first column (surface number) means a number of a lens surface when numbering from the object side, the second column R means a curvature radius of a lens surface, the third column D means a distance between lens surfaces on the optical axis, the fourth column νd means an Abbe number against a d-line (wave length λ=587.6 nm), and the fifth column nd means refractive index against a d-line (wave length λ=587.6 nm). Note that "*" attached right of the first column (surface number) means that the lens surface has an aspherical surface. Moreover, a radius of curvature "0.0000" means a plane, and refractive index of air nd=1.000000 is omitted in its descriptions.

An aspherical coefficient shown in [Aspherical Surface Data] is defined by the following conditional expression (A), where a height perpendicular to the optical axis is set to y, a distance (the amount of sagitta) along the optical axis from an tangent plane of an vertex of each aspherical surface at the height of y to each aspherical surface is set to X (y), a paraxial radius of curvature (radius of curvature of a criterion spherical surface) is set to R, a cone constant is set to x and a n-th aspherical surface coefficient (n=4, 6, 8 and 10) is set to An, is denoted by the following conditional expression (A). Note that in each example, the secondary aspherical coefficient A2 is equal to 0, and the description thereof is omitted. Moreover, in [Aspherical Surface Data], "E-n" means "×10$^{-n}$."

$$X(y)=(y^2/R)/\{1+(1-x\times y^2/R^2)^{1/2}\}+A4\times y^4+A6\times y^6\times A10\times y^{10} \quad (A)$$

[Variable Distance Data] respectively illustrates values such as a focal length f, a variable interval, back focus BF, a total length TL (a length from an first optical surface to a last optical surface (image surface I) of the zoom lens ZL) of the zoom lens in each state (upon focusing on infinity) such as the wide-angle end state, the intermediate focal length state, and the telephoto end state. [Lens Group Focal Length] respectively illustrates values such as a focal length of each lens group. [Values Corresponding To Conditional Expression] illustrates a corresponding value of each conditional expression.

Note that "mm" is generally used as units of the focal length f, the radius of curvature R, and another length in the following all general data values, however, in optical systems it is possible to obtain the same advantageous effects even if proportionally enlarged or shrunk. Moreover, in various data in Example 2 and 3 mentioned later, the same signs in the present example are used.

Table 1 below illustrates each data in Example 1. Note that radiuses of curvature R of the first surface to the 28th surface in Table 1 corresponds to signs R1 to R28 attached on the first surface to the 28th surface in FIG. 1A. Moreover, the 29th surface to the 32nd surface are planes, and surfaces corresponding in FIG. 1A are omitted. Moreover, the group numbers G1 to G5 in Table 1 correspond to each lens group G1 to G5 in Table 1. Moreover, in Example 1, each lens surface of the 16th surface, the 17th surface, and the 26th surface) is formed aspherical.

TABLE 1

[General Data]
Zoom ratio = 56.905

|  | Wide-angle end state | Intermediate focal length state | Telephoto end state |
|---|---|---|---|
| f | 4.40 | 33.00 | 250.30 |
| FNO | 3.29 | 5.24 | 6.80 |
| ω | 43.91° | 6.98° | 0.91° |
| Y | 3.43 | 4.05 | 4.05 |

[Lens Data]

| Surface number | R | D | νd | nd |
|---|---|---|---|---|
| 1 | 232.0166 | 1.8000 | 39.61 | 1.804400 |
| 2 | 64.8025 | 5.6500 | 95.00 | 1.437000 |

TABLE 1-continued

| | | | | |
|---|---|---|---|---|
| 3 | −368.2363 | 0.2000 | | |
| 4 | 72.6782 | 4.0500 | 82.57 | 1.497820 |
| 5 | 795.4829 | 0.2000 | | |
| 6 | 57.5710 | 4.1000 | 82.57 | 1.497820 |
| 7 | 320.3057 | D7 | | |
| 8 | 949.5174 | 1.0000 | 40.66 | 1.883000 |
| 9 | 8.6239 | 4.5000 | | |
| 10 | −26.4521 | 0.9000 | 40.66 | 1.883000 |
| 11 | 286.6814 | 0.2000 | | |
| 12 | 17.3116 | 3.0000 | 20.88 | 1.922860 |
| 13 | −35.6212 | 0.9000 | 35.25 | 1.910820 |
| 14 | 33.3143 | D14 | | |
| 15 | 0.0000 | 0.7500 | | (Aperture stop) |
| 16* | 7.9259 | 2.5000 | 71.67 | 1.553320 |
| 17* | −57.9778 | 0.2000 | | |
| 18 | 15.5668 | 2.1000 | 67.90 | 1.593190 |
| 19 | −158.2026 | 0.8000 | 40.66 | 1.883000 |
| 20 | 7.1185 | 0.6500 | | |
| 21 | 12.8425 | 1.9000 | 70.31 | 1.487490 |
| 22 | −33.1659 | D22 | | |
| 23 | 38.7655 | 1.2000 | 28.69 | 1.795040 |
| 24 | −77.0801 | 0.6000 | 42.09 | 1.799520 |
| 25 | 16.5271 | d25 | | |
| 26* | 16.0820 | 3.0500 | 58.28 | 1.622630 |
| 27 | −14.0205 | 0.8000 | 37.18 | 1.834000 |
| 28 | −106.3282 | D28 | | |
| 29 | 0.0000 | 0.2100 | 63.88 | 1.516800 |
| 30 | 0.0000 | 1.3480 | | |
| 31 | 0.0000 | 0.5000 | 63.88 | 1.516800 |
| 32 | 0.0000 | BF | | |

[Aspherical Surface Data]

The 16$^{th}$ surface

κ = −0.3575, A4 = 1.79600E−04, A6 = 4.41968E−07,
A8 = 0.00000E+00,
A10 = 0.00000E+00

The 17$^{th}$ surface

κ = 1.0000, A4 = 4.43002E−05, A6 = −4.79298E−08,
A8 = 0.00000E+00,
A10 = 0.00000E+00

The 26$^{th}$ surface

κ = 1.0000, A4 = 2.13923E−05, A6 = 1.24506E−07,
A8 = 0.00000E+00,
A10 = 0.00000E+00

[Variable Distance Data]

| | Wide-angle end state (Infinity) | Intermediate focal length state (Infinity) | Telephoto end state (Infinity) |
|---|---|---|---|
| f | 4.40 | 33.00 | 250.30 |
| D7 | 0.78796 | 39.29867 | 63.11146 |
| D14 | 43.22595 | 12.48438 | 2.08709 |
| D22 | 0.58671 | 8.53209 | 7.30074 |
| D25 | 7.16472 | 7.43038 | 26.40747 |
| D28 | 6.13849 | 14.70884 | 2.42338 |
| BF | 0.53000 | 0.53000 | 0.53000 |
| TL | 101.54184 | 126.09236 | 144.96814 |

[Lens Group Focal Length]

| Group number | Group first surface | Group focal length (f1~f5) |
|---|---|---|
| G1 | 1 | 81.00000 |
| G2 | 8 | −8.50000 |
| G3 | 16 | 16.68966 |
| G4 | 23 | −37.13123 |
| G5 | 26 | 31.32288 |

TABLE 1-continued

[Values Corresponding To Conditional Expression]

Conditional expression (1) f1/ft = 0.32
Conditional expression (2), (7), (11) (f1 × fw)/(f2 × ft) = −0.167
Conditional expression (3) nN1 − nP1 = 0.367
Conditional expression (4) νP1 = 95.00
Conditional expression (5), (8), (10) f4/ft = −0.148
Conditional expression (6) ΔZwt/ft = 0.089
Conditional expression (9) f2/TL2 = −0.810
Conditional expression (12) (n2f × ft)/(ν2f × r2f) = 0.407

As mentioned above, in the present embodiment, it is understandable that the conditional expressions (1) to (12) are all satisfied.

Figure 2B:
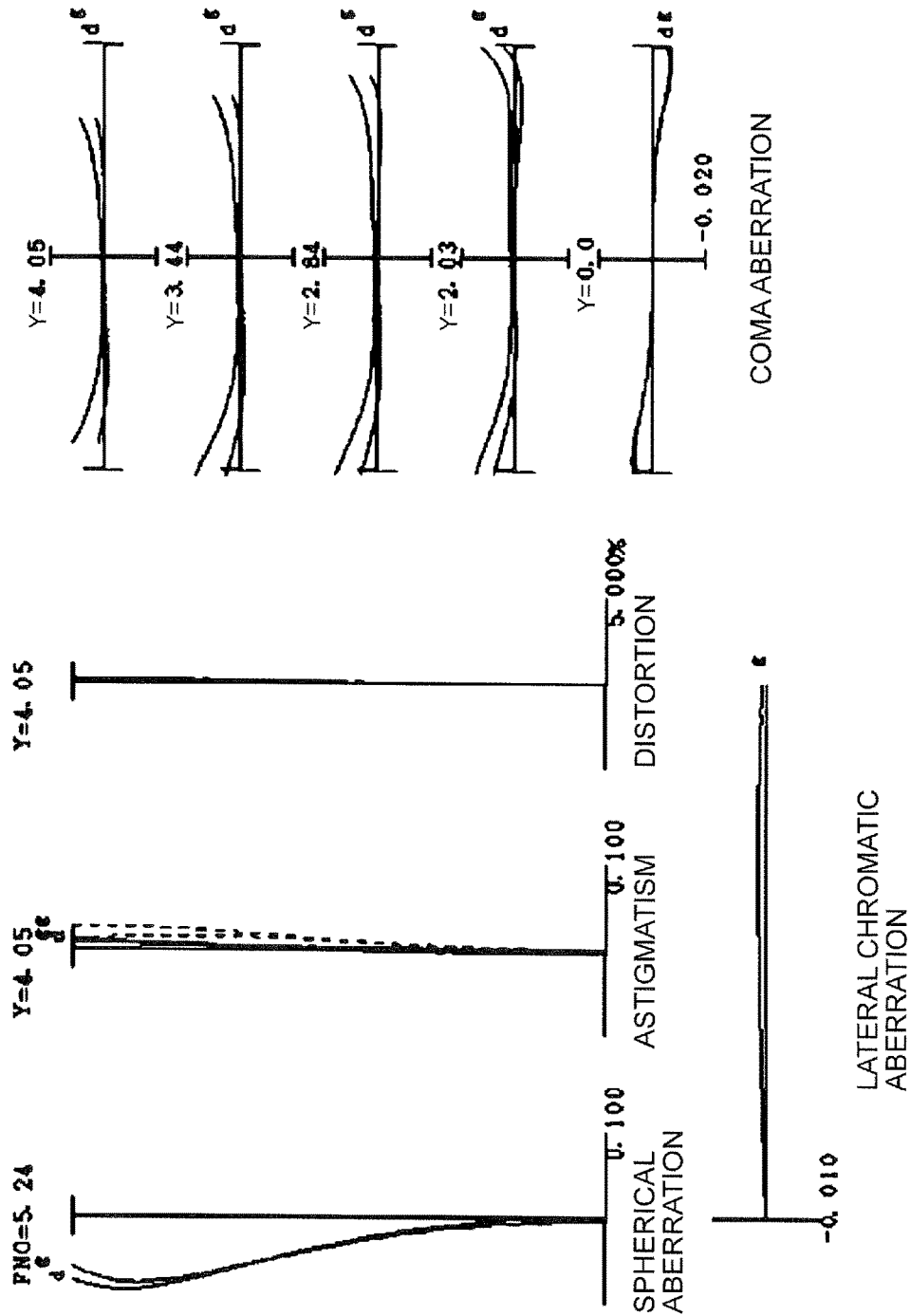
FIG. 2B depicts graphs showing various Aberrations upon focusing on infinity in the intermediate end state.

FIGS. 2A to 2C illustrate graphs showing various aberrations of the zoom lens ZL1 according to Example 1. At this point, FIG. 2A depicts graphs showing various aberrations upon focusing on infinity in the wide-angle end state (f=4.40 mm), FIG. 2B depicts graphs showing various aberrations upon focusing on infinity in the intermediate focal length state (f=33.00 mm), and FIG. 2C depicts graphs showing various aberrations upon focusing on infinity in the telephoto end state (f=250.30 mm). In each graph showing aberrations, FNO means a F number and Y means an image height. Moreover, in each graph showing aberrations, d means aberration in a d-line (λ=587.6 nm), and g means aberration in a g-line (λ=435.8 nm). Moreover, in a graph showing astigmatism, a solid-line means a sagittal image surface, and a dashed line means a meridional image surface. As mentioned above, descriptions of the graph of aberrations is the same as in other examples.

According to each graph showing aberrations, it is understandable that various aberrations is each focal length state from the wide-angle end state to the telephoto end state are properly corrected, and excellent optical performance can be obtained. As a result, by having the zoom lens ZL1 of Example 1, it is possible to secure excellent optical performance in the digital still camera.

Example 2

Figure 3A:
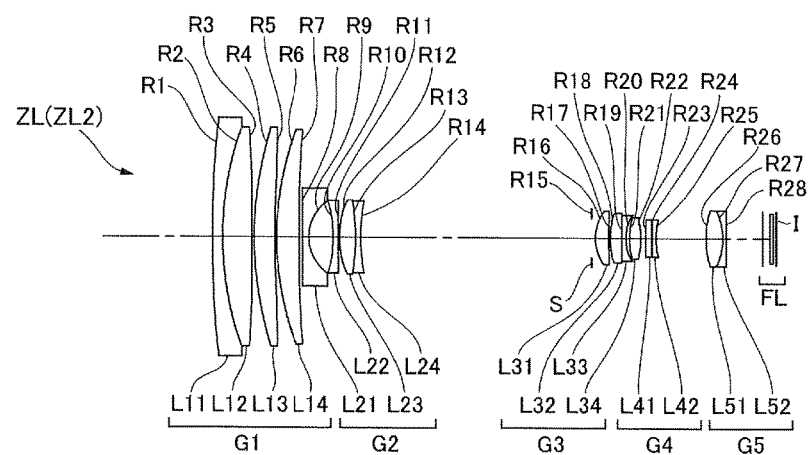
FIG. 3A is a lens configuration diagram in a wide-angle end state of a zoom lens according to Example 2.
Figure 3B:
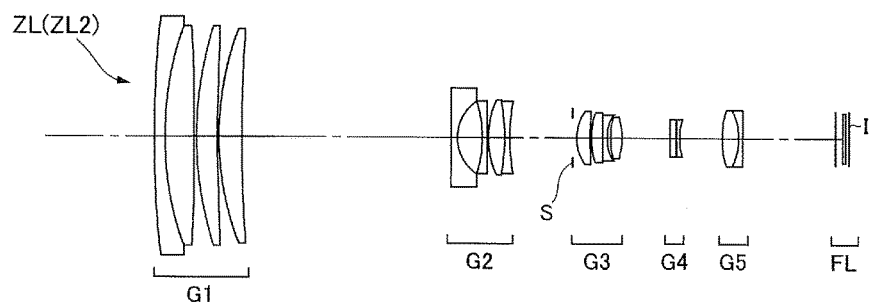
FIG. 3B is a lens configuration diagram in an intermediate focal length state.
Figure 3C:
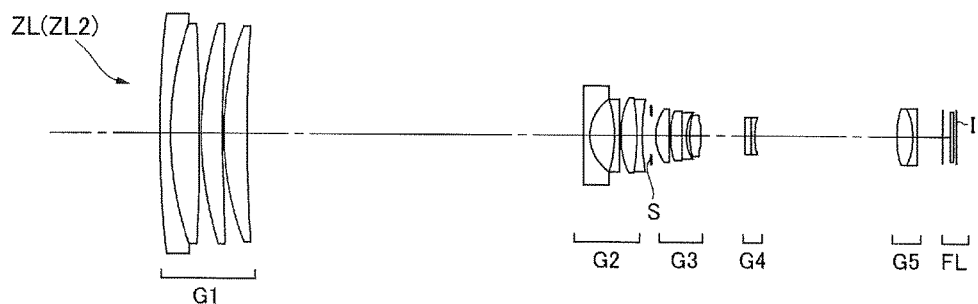
FIG. 3C is a lens configuration diagram in a telephoto end state.

Hereinafter, Example 2 of the present application is described using FIGS. 3A to 3C, FIGS. 4A to 4C, and Table 2. FIG. 3A illustrates a lens configuration diagram in a wide-angle end state of the zoom lens ZL (ZL2) according to Example 2, FIG. 3B illustrates a lens configuration diagram in an intermediate focal length state, and FIG. 3C illustrates a lens configuration diagram in a telephoto end state. The zoom lens ZL2 according to Example 2 is composed of, in order on an optical axis from an object, a first lens group G1 having positive refractive power, a second lens group G2 having negative refractive power, a third lens group G3 having positive refractive power, a fourth lens group G4 having negative refractive power, and a fifth lens group G5 having positive refractive power. The first lens group G1, the second lens group G2, the third lens group G3, the fourth lens group G4, and the fifth lens group G5 respectively move along the optical axis so that a distance between the first lens group G1 and the second lens group G2 increases, a distance between the second lens group G2 and the third lens group G3 decreases, a distance between the third lens group G3 and the fourth lens group G4 changes, and a distance between the fourth lens group G4 and the fifth lens group G5 changes upon zooming from the wide-angle end state to the telephoto end state.

The first lens group G1 is composed of a meniscus negative lens L11 having a convex surface facing the object, a biconvex first positive lens L12, a meniscus second positive lens L13 having a convex surface facing the object, a meniscus third positive lens L14 having a convex surface facing the object. In the first lens group G1, the negative lens L11 and the first positive lens L12 are cemented each other.

The second lens group G2 is composed of, in order on the optical axis from the object, a first negative lens L21 having a concave surface facing an image surface I, a biconcave second negative lens L22, a biconvex positive lens L23, and a biconcave third negative lens L24. In the second lens group G2, the positive lens L23 and the third negative lens L24 are cemented each other.

The third lens group G3 is composed of, in order on the optical axis from the object, a biconvex first positive lens L31, a second positive lens L32 having a convex surface facing the object, a negative lens L33 having a concave surface facing the image surface I, and a biconvex third positive lens L34. In third lens group G3, the second positive lens L32 and the negative lens L33 are cemented each other. Moreover, both side of lens surfaces of the first positive lens L31 have an aspherical surface.

The fourth lens group G4 is composed of, in order on the optical surface from the object, a biconvex positive lens L41, and a biconcave negative lens L42. In the fourth lens group G4, the positive lens L41 and the negative lens L42 are cemented each other.

The fifth lens group G5 is composed of, in order on the optical axis from the object, a biconvex positive lens L51, and a meniscus negative lens L52 having a convex surface facing the image surface I. In the fifth lens group G5, the positive lens L51 and the negative lens L52 are cemented each other. Moreover, a lens surface on the object side of the positive lens L51 has an aspherical surface.

The aperture stop S is disposed in the neighborhood of the object side of the third lens group G3, and moves on the same trajectory as that of the third lens group G3 upon zooming from the wide-angle end state to the telephoto end state. Note that focusing from an infinity object to a point-blank range object (finite distance object) is performed by moving the fifth lens group G5 to the object side on the optical axis. Moreover, a filter group FL arranged between the fifth lens group G5 and the image surfaces I composed of a low-pass filter, an infrared cut filter, etc.

Table 2 below illustrates each data in Example 2. Note that radiuses of curvature R of the first surface to the 28th surface in Table 2 correspond to sings R1 to R28 attached to the first surface to the 28th surface in FIG. 3A. Moreover, the 29th surface to the 32nd surface are planes, and surfaces corresponding in FIG. 3A are omitted. Moreover, the group numbers G1 to G5 in Table 2 correspond to each lens group G1 to G5 in FIGS. 3A to 3C. Moreover, in Example 2, each lens surface of the 16th surface, the 17th surface, and the 26th surface is formed aspherical.

TABLE 2

[General Data]
Zoom ratio = 56.96

|  | Wide-angle end state | Intermediate focal length state | Telephoto end state |
| --- | --- | --- | --- |
| f | 4.40 | 33.20 | 250.61 |
| FNO | 3.41 | 5.34 | 6.69 |

TABLE 2-continued

| ω | 43.90° | 6.94° | 0.91° |
|---|---|---|---|
| Y | 3.43 | 4.05 | 4.05 |

[Lens Data]

| Surface number | R | D | vd | nd |
|---|---|---|---|---|
| 1 | 283.8635 | 1.8000 | 39.61 | 1.804400 |
| 2 | 66.0031 | 5.6500 | 95.00 | 1.437000 |
| 3 | −244.4056 | 0.2000 | | |
| 4 | 70.1583 | 4.0500 | 82.57 | 1.497820 |
| 5 | 640.8571 | 0.2000 | | |
| 6 | 56.2115 | 4.1000 | 82.57 | 1.497820 |
| 7 | 286.2808 | D7 | | |
| 8 | −1400.8161 | 1.0000 | 47.35 | 1.788000 |
| 9 | 7.9433 | 4.5000 | | |
| 10 | −23.9387 | 0.9000 | 42.73 | 1.834810 |
| 11 | 54.6102 | 0.2000 | | |
| 12 | 17.2566 | 3.0000 | 20.88 | 1.922860 |
| 13 | −46.1324 | 0.9000 | 35.25 | 1.910820 |
| 14 | 46.1324 | D14 | | |
| 15 | 0.0000 | 0.7500 | | (Aperture stop) |
| 16* | 9.5535 | 2.5000 | 71.67 | 1.553320 |
| 17* | −72.3929 | 0.2000 | | |
| 18 | 10.5738 | 2.1000 | 82.57 | 1.497820 |
| 19 | −811.9421 | 0.8000 | 40.66 | 1.883000 |
| 20 | 8.1310 | 0.6500 | | |
| 21 | 21.2521 | 1.9000 | 70.31 | 1.487490 |
| 22 | −21.2521 | D22 | | |
| 23 | 40.5152 | 1.2000 | 25.45 | 1.805180 |
| 24 | −90.5269 | 0.6000 | 40.97 | 1.806100 |
| 25 | 16.4742 | D25 | | |
| 26* | 16.1274 | 3.0500 | 58.28 | 1.622630 |
| 27 | −12.9457 | 0.8000 | 37.18 | 1.834000 |
| 28 | −90.6714 | D28 | | |
| 29 | 0.0000 | 0.2100 | 63.88 | 1.516800 |
| 30 | 0.0000 | 1.2180 | | |
| 31 | 0.0000 | 0.5000 | 63.88 | 1.516800 |
| 32 | 0.0000 | BF | | |

[Aspherical Surface Data]

The 16$^{th}$ surface

κ = 0.5602, A4 = −1.97251E−05, A6 = 4.63015E−07, A8 = 0.00000E+00, A10 = 0.00000E+00

The 17$^{th}$ surface

κ = 1.0000, A4 = 5.07627E−05, A6 = 2.26946E−07, A8 = 0.00000E+00, A10 = 0.00000E+00

The 26$^{th}$ surface

κ = 1.0000, A4 = 2.10907E−05, A6 = 1.90396E−07, A8 = 0.00000E+00, A10 = 0.00000E+00

[Variable Distance Data]

| | Wide-angle end state (Infinity) | Intermediate focal length state (Infinity) | Telephoto end state (Infinity) |
|---|---|---|---|
| f | 4.40 | 33.20 | 250.61 |
| D7 | 0.78856 | 38.98294 | 62.22136 |
| D14 | 42.46359 | 11.70181 | 2.04839 |
| D22 | 1.08941 | 9.00658 | 8.04140 |
| D25 | 9.07755 | 7.64986 | 26.11914 |
| D28 | 5.45698 | 15.81339 | 3.54723 |
| BF | 0.53000 | 0.53000 | 0.53000 |
| TL | 102.38408 | 126.66256 | 145.48551 |

[Lens Group Focal Length]

| Group number | Group first surface | Group focal length (f1~f5) |
|---|---|---|
| G1 | 1 | 79.47658 |
| G2 | 8 | −8.04863 |
| G3 | 16 | 16.53205 |
| G4 | 23 | −35.58931 |
| G5 | 26 | 31.34725 |

[Values Corresponding To Conditional Expression]

Conditional expression (1) f1/ft = 0.32
Conditional expression (2), (7), (11) (f1 × fw)/(f2 × ft) = −0.173
Conditional expression (3) nN1 − nP1 = 0.367
Conditional expression (4) vP1 = 95.00
Conditional expression (5), (8), (10) f4/ft = −0.142
Conditional expression (6) ΔZwt/ft = 0.088
Conditional expression (9) f2/TL2 = −0.767
Conditional expression (12) (n2f × ft)/(v2f × r2f) = 0.294

As mentioned above, in the present example, it is understandable that the conditional expressions (1) to (12) are all satisfied.

FIG. 4A to 4C illustrate graphs showing various aberrations of the zoom lens ZL2 according to Example 2. At this point, FIG. 4A depicts graphs showing various aberrations upon focusing infinity in the wide-angle end state (f=4.40 mm), FIG. 4B depicts graphs showing various aberrations upon focusing on infinity in the intermediate focal length state (f=33.20 mm), and FIG. 4C depicts graphs showing various aberrations upon focusing on infinity in the telephoto end state (f=250.61 mm). According to each graph of aberrations, in Example 2 it is understandable that various aberrations in each focal length state from the wide-angle end state to the telephoto end state are properly corrected. As a result, by having the zoom lens ZL2 of Example 2, it is possible to secure excellent optical performance in the digital still camera.

Example 3

Figure 5A:
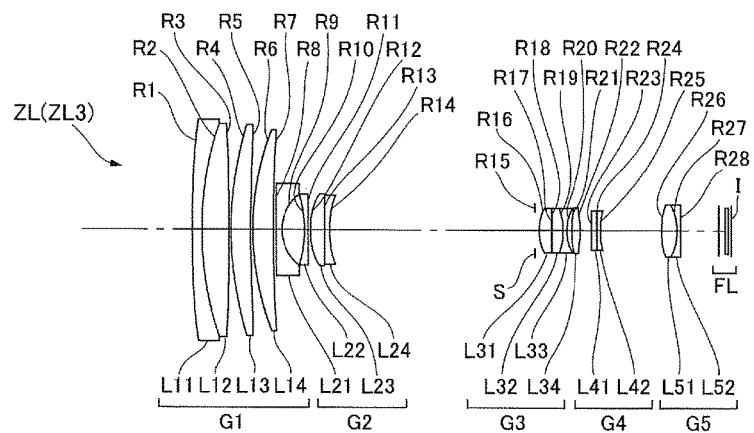
FIG. 5A is a lens configuration diagram in a wide-angle end state of a zoom lens according to Example 3.
Figure 5B:
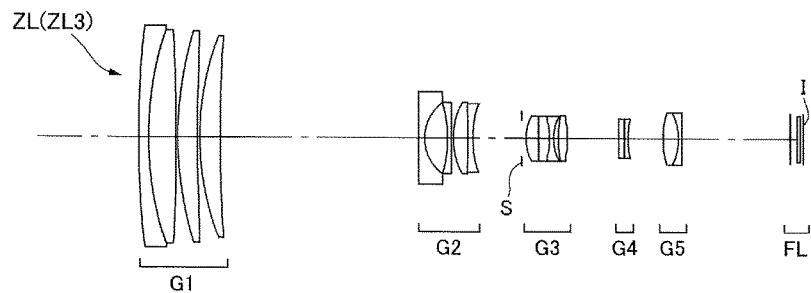
FIG. 5B is a lens configuration diagram in an intermediate focal length state.
Figure 5C:
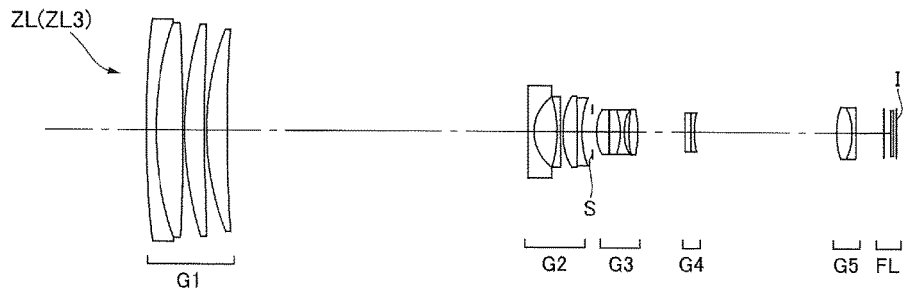
FIG. 5C is a lens configuration diagram in a telephoto end state.

Hereinafter, Example 3 of the present application is described using FIGS. 5A to 5C, FIGS. 6A to 6C, and Table 3. FIG. 5A illustrates a lens configuration diagram in the wide-angle end state of the zoom lens ZL (ZL3) according to Example 3, FIG. 5B illustrates a lens configuration diagram in the intermediate focal length state, and FIG. 5C illustrates a lens configuration diagram in the telephoto end state. The zoom lens ZL3 according to Example 3 is composed of, in order on an optical axis from an object, a first lens group G1 having positive refractive power, a second lens group G2 having negative refractive power, a third lens group G3 having positive refractive power, a fourth lens group G4 having negative refractive power, and a fifth lens group G5 having positive refractive power. The first lens group G1, the second lens group G2, the third lens group G3, the fourth lens group G4, and the fifth lens group G5 respectively move along the optical axis so that upon zooming from the wide-angle end state to the telephoto end state a distance between the first lens group G1 and the second lens group G2 increases, a distance between the second lens group G2 and the third lens group G3 decreases, a distance between the third lens group G3 and the fourth lens group G4 changes, and a distance between the fourth lens group G4 and the fifth lens group G5 changes.

The first lens group G1 is compose of, in order on the optical axis from the object, a meniscus negative lens L11 having a convex surface to the object, a biconvex first positive lens L12, a meniscus second positive lens L13 having a convex surface facing the object, and a meniscus third positive lens L14 having a convex surface facing the object. In the first lens group G1, the negative lens L11 and the first positive lens L12 are cemented each other.

The second lens group G2 is composed of, in order on the optical axis from the object, a first negative lens L21 having a concave surface facing an image surface I, a meniscus second negative lens L22 having a convex surface to the image surface I, a biconvex positive lens L23, and a biconcave third negative lens L24. In the second lens group G2, the positive lens L23 and the third negative lens L24 are cemented each other.

The third lens group G3 is composed of, in order on the optical axis from the object, a biconvex first positive lens L31, a biconvex second positive lens L32, a biconcave negative lens L33, and a biconvex third positive lens L34. In third lens group G3, the second positive lens L32 and the negative lens L33 are cemented each other. Moreover, both side of lens surfaces of the first positive lens L31 have an aspherical surface.

The fourth lens group G4 is composed of, in order on the optical axis from the object, a meniscus positive lens L41 having a convex surface facing the object, and a meniscus negative lens L42 having a convex surface facing the object. In the fourth lens group G4, the positive lens L41 and the negative lens L42 are cemented each other.

The fifth lens group G5 is composed of, in order on the optical axis from the object, a biconvex positive lens L51, and a meniscus negative lens L52 having a convex surface facing the image surface I. In the fifth lens group G5, the positive lens L51 and the negative lens L52 are cemented each other. Moreover, a lens surface on the object side of the positive lens L51 has an aspherical surface.

The aperture stop S is disposed in the neighborhood of the object side of the third lens group G3, and moves on the same trajectory as that of the third lens group G3 upon zooming from the wide-angle end state to the telephoto end state. Note that focusing from an infinity object to a point-blank range object (finite distance object) is performed by moving the fifth lens group G5 to the object side on the optical axis. Moreover, a filter group FL arranged between the image surfaces I and the fifth lens group G5 is composed of a low-pass filter, an infrared cut filter, etc.

Table 3 below illustrates each data in Example 3. Note that radiuses of curvature R of the first surface to the 28th surface in Table 3 correspond to signs R1 to R28 assigned to the first surface to the 28th surface in FIG. 5A. Moreover, the 29th surface to the 32nd surface are planes, and corresponding surfaces are omitted in FIG. 5A. Moreover, the group numbers G1 to G5 in Table 3 correspond to each lens group G1 to G5 in FIGS. 5A to 5C. Moreover, in Example 3, each lens surface of the 16th surface, the 17th surface, and the 26th surface is formed aspherical.

TABLE 3

[General Data]
Zoom ratio = 56.835

|  | Wide-angle end state | Intermediate focal length state | Telephoto end state |
|---|---|---|---|
| f | 4.40 | 33.00 | 250.00 |
| FNO | 3.41 | 4.49 | 6.48 |
| ω | 43.91° | 6.98° | 0.91° |
| Y | 3.43 | 4.05 | 4.05 |

[Lens Data]

| Surface number | R | D | vd | nd |
|---|---|---|---|---|
| 1 | 205.6164 | 1.8000 | 40.66 | 1.883000 |
| 2 | 61.6090 | 5.6500 | 95.00 | 1.437000 |
| 3 | −324.2007 | 0.2000 | | |
| 4 | 70.4934 | 4.0500 | 82.57 | 1.497820 |
| 5 | 867.8172 | 0.2000 | | |
| 6 | 52.0955 | 4.1000 | 82.57 | 1.497820 |
| 7 | 362.4668 | D7 | | |
| 8 | −1680.9225 | 1.0000 | 40.66 | 1.883000 |
| 9 | 8.3884 | 4.5000 | | |
| 10 | −22.8207 | 0.9000 | 46.59 | 1.816000 |
| 11 | −209.0345 | 0.2000 | | |
| 12 | 14.1862 | 3.0000 | 20.88 | 1.922860 |
| 13 | −81.1634 | 0.9000 | 35.25 | 1.910820 |
| 14 | 18.6274 | D14 | | |
| 15 | 0.0000 | 0.7500 | | (Aperture stop) |
| 16* | 10.1147 | 2.5000 | 71.67 | 1.553320 |
| 17* | −50.0000 | 0.2000 | | |
| 18 | 108.8627 | 2.1000 | 63.34 | 1.618000 |
| 19 | −13.3036 | 0.8000 | 46.59 | 1.816000 |
| 20 | 11.7659 | 0.8000 | | |
| 21 | 16.6753 | 1.9000 | 63.88 | 1.516800 |
| 22 | −14.6420 | D22 | | |
| 23 | 28.0885 | 1.2000 | 28.69 | 1.795040 |
| 24 | 44.8967 | 0.6000 | 42.09 | 1.799520 |
| 25 | 15.4924 | D25 | | |
| 26* | 18.5168 | 3.0500 | 65.44 | 1.603000 |
| 27 | −11.3088 | 0.8000 | 37.18 | 1.834000 |
| 28 | −34.8472 | D28 | | |
| 29 | 0.0000 | 0.2100 | 63.88 | 1.516800 |
| 30 | 0.0000 | 1.3480 | | |
| 31 | 0.0000 | 0.5000 | 63.88 | 1.516800 |
| 32 | 0.0000 | BF | | |

[Aspherical Surface Data]

The 16$^{th}$ surface

κ = 0.5886, A4 = −8.28313E−06, A6 = 4.41968E−07, A8 = 0.00000E+00, A10 = 0.00000E+00

The 17$^{th}$ surface

κ = 1.0000, A4 = 7.83065E−05, A6 = −4.79298E−08, A8 = 0.00000E+00, A10 = 0.00000E+00

The 26$^{th}$ surface

κ = 1.0000, A4 = 2.13923E−05, A6 = 1.24506E−07, A8 = 0.00000E+00, A10 = 0.00000E+00

[Variable Distance Data]

|  | Wide-angle end state (Infinity) | Intermediate focal length state (Infinity) | Telephoto end state (Infinity) |
|---|---|---|---|
| f | 4.40 | 33.00 | 250.00 |
| D7 | 0.78753 | 39.66023 | 60.10680 |
| D14 | 40.75983 | 9.95274 | 2.08714 |
| D22 | 2.04196 | 10.00538 | 9.28399 |
| D25 | 12.03913 | 7.11125 | 28.13863 |
| D28 | 7.11966 | 20.94668 | 5.17139 |
| BF | 0.53000 | 0.53000 | 0.53000 |
| TL | 106.53610 | 131.46428 | 148.57595 |

TABLE 3-continued

[Lens Group Focal Length]

| Group number | Group first surface | Group focal length (f1~f5) |
|---|---|---|
| G1 | 1 | 76.00000 |
| G2 | 8 | -7.60000 |
| G3 | 16 | 18.50000 |
| G4 | 23 | -46.00000 |
| G5 | 26 | 28.00000 |

[Values Corresponding To Conditional Expression]

Conditional expression (1) f1/ft = 0.30
Conditional expression (2), (7), (11) (f1 × fw)/(f2 × ft) = -0.176
Conditional expression (3) nN1 - nP1 = 0.446
Conditional expression (4) νP1 = 95.00
Conditional expression (5), (8), (10) f4/ft = -0.184
Conditional expression (6) ΔZwt/ft = 0.086
Conditional expression (9) f2/TL2 = -0.724
Conditional expression (12) (n2f × ft)/(ν2f × r2f) = 0.728

As mentioned above, in the present example, it is understandable that the conditional expressions (1) to (12) are all satisfied.

FIGS. 6A to 6C illustrate graphs showing various aberrations of the zoom lens ZL3 according to Example 3. At this point, FIG. 6A depicts graphs showing various aberrations upon focusing on infinity in the wide-angle end state (f=4.40 mm), FIG. 6B depicts graphs showing various aberrations upon focusing on infinity in the intermediate focal length state (f=33.00 mm), and FIG. 6C depicts graphs showing various aberrations upon focusing on infinity in the telephoto end state (f=250.00 mm). According to each graph showing aberrations, in Example 3 it is understandable that various aberrations are properly corrected in each focal length state from the wide-angle end state to the telephoto end state, thus excellent optical performance can be obtained. As a result, by having the zoom lens ZL3 of Example 3, it is possible to secure excellent optical performance in the digital camera CAM.

As mentioned above, according to each example, it is possible to realize the zoom lens and the optical device (digital still camera) having a large zoom ratio although they are small, and equipped with excellent optical performance.

Note that in the above-mentioned embodiment, the content described below can be applied to them within a range in which the optical performance is not spoiled.

In the above-mentioned examples, a five group configuration is exampled, however, this is applicable to another group configuration such as a six group, etc. Moreover, this is applicable to a configuration in which a lens or a lens group is added closest to the object, or a configuration in which a lens or a lens group is added closest to the image. Moreover, a lens group means a part that has at least one lens separated with an air distance which changes upon zooming.

Moreover, it is appreciated that a focusing lens group is configured to focus on a short distance object from an infinity object by moving a single or a plurality of lens group(s), or a partial lens group in an optical axis direction. This focusing lens group is also applicable to autofocus, and is also suitable for motor drive for autofocus (using an ultrasonic motor, etc.). In particular, it is appreciated that the fifth lens group G5 is used as a focusing lens group.

Moreover, it is appreciated a vibration control lens group is configured to move a lens group or a partial lens group in a manner of having a component in a direction perpendicular to the axis direction, or rotate and move (swing) it in a direction within a surface including the axis direction so that image blur due to camera shake is corrected. In particular, it is preferable that the third lens group G3 is used as a vibration control lens group.

Moreover, it is also appreciated that a lens surface is formed with a spherical surface or a plane, or formed in an aspherical surface. In case a lens surface has a spherical surface or a plane, it is possible to easily have lens processing and an assembly adjustment, and to prevent degradation of optical performance due to errors of the processing and the assembly adjustment, thus it is preferable. Moreover, it is preferable because there is less degradation of the depiction performance when an image surface is shifted. In case a lens surface has an aspherical surface, it is appreciated that the aspherical surface is formed as any one of an aspherical surface which is formed through grinding processing, a glass mold aspherical surface which glass is formed into a aspherical surface configuration using a mold, and a complexed aspherical surface which a resin is formed on a surface of glass and formed in a aspherical surface configuration. Moreover, it is appreciated that a lens surface is formed as a diffractive surface, additionally a lens is formed as a graded-index lens (GRIN lens) or a plastic lens.

The aperture stop S is preferable to be disposed in the neighborhood of the third lens group G3, however this is substituted using a frame of a lens instead of providing a member as an aperture stop. Moreover, in each above-mentioned example, although an aperture stop is configured to move on the same trajectory as that of the third lens group upon zooming from the wide-angle end state to the telephoto end state, this may be configured to move on another trajectory in comparison with the third lens group, instead.

It is appreciated that a reflection reducing film having high transmittivity in a wide wavelength band is formed on each lens surface in order to reduce flare and ghosting and attain high optical performance with high contrast.

Moreover, in the zoom lenses according to the present embodiments the zoom ratio is approximately 50 to 70.

Moreover, although the zoom lens of the present embodiment is used for the digital still camera, it is not limited to this and can be used also for optical device, such as a digital camcorder.

EXPLANATION OF NUMERALS AND CHARACTERS

CAM Digital still camera (optical device)
ZL Zoom lens
G1 First lens group
G2 Second lens group
G3 Third lens group
G4 Fourth lens group
G5 Fifth lens group
S Aperture stop
I Image surface

The invention claimed is:

1. A zoom lens comprising, in order on an optical axis from an object, a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group respectively moving along the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state of the zoom lens, the first lens group comprises a cemented lens of a positive refractive power lens and a negative refractive power lens, and the following conditional expressions being satisfied:

$$0.25 < f1/ft < 0.38$$

$$-0.176 \leq (f1 \times fw)/(f2 \times ft) < -0.160$$

$$90 < vP1$$

where f1 denotes a focal length of the first lens group, ft denotes a focal length of the zoom lens in the telephoto end state, fw denotes a focal length of the zoom lens in the wide-angle end state, f2 denotes a focal length of the second lens group, and vP1 denotes an Abbe number of the positive refractive power lens of the cemented lens.

2. A zoom lens according to claim 1, wherein the first lens group comprises three positive refractive power lenses.

3. A zoom lens according to claim 1, wherein the following conditional expression is satisfied:

$$0.367 < nN1 - nP1$$

where nN1 denotes refractive index at d-line of the negative refractive power lens of the cemented lens, and nP1 denotes refractive index at d-line of the positive refractive power lens of the cemented lens.

4. A zoom lens according to claim 1, wherein the following conditional expression is satisfied:

$$-0.18 < f4/ft < -0.14$$

where f4 denotes a focal length of the fourth lens group.

5. A zoom lens according to claim 1, wherein the fourth lens group is composed of a cemented lens of one positive refractive power lens and one negative refractive power lens.

6. A zoom lens according to claim 1, wherein an aperture stop is disposed to an object side of the third lens group, and the following conditional expression is satisfied:

$$0.084 < \Delta Zwt/ft < 0.090$$

where $\Delta Zwt$ denotes a moving distance of the aperture stop to the object side on the optical axis upon zooming from the wide-angle end state to the telephoto end state.

7. An optical device comprising a zoom lens which forms an image of an object on a predetermined surface, characterized in that the zoom lens is a zoom lens according to claim 1.

8. A zoom lens comprising, in order on an optical axis from an object, a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group respectively moving on the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state of the zoom lens, the second lens group being composed of, in order on the optical axis from the object, a first negative refractive power lens, a second negative refractive power lens, a positive refractive power lens, and a third negative refractive power lens, the positive refractive power lens and the third negative refractive power lens being cemented to each other, and the following conditional expressions being satisfied:

$$-0.180 < (f1 \times fw)/(f2 \times ft) < -0.160$$

$$-0.180 < f4/ft < -0.140$$

where fw denotes a focal length of the zoom lens in the wide-angle end state, ft denotes a focal length of the zoom lens in the telephoto end state, f1 denotes a focal length of the first lens group, f2 denotes a focal length of the second lens group, and f4 denotes a focal length of the fourth lens group.

9. A zoom lens according to claim 8, wherein the fourth lens group is composed of a cemented lens of one positive refractive power lens and one negative refractive power lens.

10. An optical device comprising a zoom lens which forms an image of an object on a predetermined surface, characterized in that the zoom lens is a zoom lens according to claim 8.

11. A zoom lens comprising, in order on an optical axis from an object, a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group respectively moving on the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state of the zoom lens, the fourth lens group consisting of a cemented lens of one positive refractive power lens and one negative refractive power lens, and the following conditional expressions being satisfied:

$$-0.90 < f2/TL2 < -0.60$$

$$-0.180 < f4/ft < -0.140$$

where f2 denotes a focal length of the second lens group, TL2 denotes a length on the optical axis of the second lens group, f4 denotes a focal length of the fourth lens group, and ft denotes a focal length of the zoom lens in the telephoto end state.

12. A zoom lens according to claim 11, wherein the following conditional expression is satisfied:

$$-0.180 < (f1 \times fw)/(f2 \times ft) < -0.160$$

where f1 denotes a focal length of the first lens group, and fw denotes a focal length of the zoom lens in the wide-angle end state.

13. An optical device comprising a zoom lens which forms an image of an object on a predetermined surface, characterized in that the zoom lens is a zoom lens according to claim 11.

14. A method for manufacturing a zoom lens, the method comprising the steps of:

disposing, in order on an optical axis from an object, a first lens group having positive refractive power, a second lens group having negative refractive power, a third lens group having positive refractive power, a fourth lens group having negative refractive power, and a fifth lens group having positive refractive power, with the first lens group, the second lens group, the third lens group, the fourth lens group, and the fifth lens group being movable along the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state of the zoom lens, and the first lens group comprising a cemented lens of a positive refractive power lens and a negative refractive power lens; and satisfying the following conditional expressions:

$$0.25 < f1/ft < 0.38$$

$$-0.1765 \leq (f1 \times fw)/(f2 \times ft) < -0.160$$

$$90 < vP1$$

where f1 denotes a focal length of the first lens group, ft denotes a focal length of the zoom lens in the telephoto end state, fw denotes a focal length of the zoom lens in the wide-angle end state, f2 denotes a focal length of the second lens group, and vP1 denotes an Abbe number of the positive refractive power lens of the cemented lens.

15. A method for manufacturing a zoom lens, the method comprising the steps of:

disposing, in order on an optical axis from an object, a first lens group having positive refractive power, a second lens group having negative refractive power, a third lens group having positive refractive power, a fourth lens group having negative refractive power, and a fifth lens group having positive refractive power, with the first lens group, the second lens group, the third lens group, the fourth lens group, and the fifth lens group being movable on the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state of the zoom lens;

configuring the second lens group to include, in order on the optical axis from the object, a first negative refractive power lens, a second negative refractive power lens, a positive refractive power lens, and a third negative refractive power lens cemented to the positive refractive power lens; and satisfying the following conditional expressions:

$$-0.180 < (f1 \times fw)/(f2 \times ft) < -0.160$$

$$-0.180 < f4/ft < -0.140$$

where fw denotes a focal length of the zoom lens in the wide-angle end state, ft denotes a focal length of the zoom lens in the telephoto end state, f1 denotes a focal length of the first lens group, f2 denotes a focal length of the second lens group, and f4 denotes a focal length of the fourth lens group.

16. A method for manufacturing a zoom lens, the method comprising the steps of:

disposing, in order on an optical axis from an object, a first lens group having positive refractive power, a second lens group having negative refractive power, a third lens group having positive refractive power, a fourth lens group having negative refractive power, and a fifth lens group having positive refractive power, with the first lens group, the second lens group, the third lens group, the fourth lens group, and the fifth lens group being movable on the optical axis so that a distance between the first lens group and the second lens group, a distance between the second lens group and the third lens group, a distance between the third lens group and the fourth lens group, and a distance between the fourth lens group and the fifth lens group respectively change upon zooming from a wide-angle end state to a telephoto end state of the zoom lens, and the fourth lens group consisting of a cemented lens of one positive refractive power lens and one negative refractive power lens; and satisfying the following conditional expressions:

$$-0.90 < f2/TL2 < -0.60$$

$$-0.180 < f4/ft < -0.140$$

where f2 denotes a focal length of the second lens group, TL2 denotes a length on the optical axis of the second lens group, f4 denotes a focal length of the fourth lens group, and ft denotes a focal length of the zoom lens in the telephoto end state.

* * * * *